US007911973B2

(12) United States Patent
Kumazawa et al.

(10) Patent No.: US 7,911,973 B2
(45) Date of Patent: Mar. 22, 2011

(54) MOVING ROUTER, HOME AGENT, ROUTER POSITION REGISTRATION METHOD, AND MOVING NETWORK SYSTEM

(75) Inventors: Masayuki Kumazawa, Kanagawa (JP); Taisuke Matsumoto, Kanagawa (JP); Yasuhiko Watanabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1111 days.

(21) Appl. No.: 11/571,703

(22) PCT Filed: Jul. 5, 2005

(86) PCT No.: PCT/JP2005/012367
§ 371 (c)(1),
(2), (4) Date: Jan. 5, 2007

(87) PCT Pub. No.: WO2006/004102
PCT Pub. Date: Jan. 12, 2006

(65) Prior Publication Data
US 2008/0002684 A1    Jan. 3, 2008

(30) Foreign Application Priority Data

Jul. 6, 2004   (JP) ................................. 2004-199170
Oct. 7, 2004   (JP) ................................. 2004-294812

(51) Int. Cl.
*H04L 12/28* (2006.01)
(52) U.S. Cl. ...................................................... 370/254
(58) Field of Classification Search ........................ None
See application file for complete search history.

(56) References Cited

U.S. PATENT DOCUMENTS

| 6,636,498 B1* | 10/2003 | Leung .......................... 370/338 |
| 7,430,174 B2* | 9/2008 | Janneteau et al. ............ 370/238 |
| 2003/0055922 A1* | 3/2003 | Kim et al. ..................... 709/220 |
| 2003/0095523 A1* | 5/2003 | Korus et al. ................... 370/338 |
| 2003/0161287 A1* | 8/2003 | Venkitaraman et al. ....... 370/338 |
| 2005/0099971 A1* | 5/2005 | Droms et al. ................. 370/328 |

FOREIGN PATENT DOCUMENTS

| JP | 09-252323 | 9/1997 |
| JP | 2003-283546 | 10/2003 |

OTHER PUBLICATIONS

Devarapalli, Vijay et al., Network Mobility (NEMO) Basic Support Protocol, draft-ietf-nemo-basic-suport-03, Jun. 2004.* Vijay Devarapalli et al.; "Network Mobility (NEMO) Basic Support Protocol"; NEMO Working Group, draft-ietf-nemo-basic-support-03. txt, Jun. 2004.
Seongho Cho et al.; Neighbor MR Authentication and Registration Mechanism in Multihomed Mobile Networks, NEMO Working Group, draft-cho-nemo-mr-registration-00. txt, Apr. 2004.
International Search Report for corresponding International PCT Application No. PCT/JP2005/012367 dated Aug. 16, 2005.

* cited by examiner

*Primary Examiner* — Chirag G Shah
*Assistant Examiner* — Yong Zhou
(74) *Attorney, Agent, or Firm* — RatnerPrestia

(57) ABSTRACT

When first mobile router, which has a MNP, generates a key which corresponds to that MNP and transmits a registration request packet including the key to home agent, home agent stores the MNP and key of the first mobile router, and sends main mobile router registration approval. When first mobile router receives this response, it distributes the MNP and key to second mobile router in moving network. Second mobile router, which receives this, transmits a registration request packet including the MNP and key to home agent, and thereby, home agent registers second mobile router as a subsidiary mobile router. By this means, it is possible to prevent illegal acquirement of a packet addressed to a moving network by use of a mobile router which shares the network prefix (MNP).

11 Claims, 32 Drawing Sheets

FIG. 22

| 2401 | 2402 | 2403 |
|---|---|---|
| HA | HoA | CoA |
| Address (HA6) | HoA (MR4) | CoA (MR4) |

FIG. 23

| 2601 | 2602 | 2603 |
|---|---|---|
| MNP | Key | Registration flag |
| MNP1 | Key1 | 1 |

FIG. 24A

| HoA | CoA | MNP | Key | Lifetime | D flag |
|---|---|---|---|---|---|
| | | | | | |
| HoA (MR4) | CoA (MR4) | MNP1 | Key1 (MNP1) | 25 | 0 |
| HoA (MR5) | CoA (MR5) | MNP1 | – | 30 | 1 |
| | | | | | |

Columns: 2801, 2802, 2803, 2804, 2805, 2806

FIG. 24B

| HoA | CoA | MNP | Key | Lifetime | D flag |
|---|---|---|---|---|---|
| HoA (MR4) | CoA (MR4) | MNP1 | Key2 (MNP1) | 30 | 0 |
| HoA (MR5) | CoA (MR5) | MNP1 | – | 5 | 1 |
| | | | | | |

FIG. 25

| HoA | MNP |
|---|---|
| HoA (MR4) | MNP1 |

Columns: 2701, 2702

FIG. 27

| Version | Traffic class | Flow label | | |
|---|---|---|---|---|
| Payload length | | Next header | | Pop limit |
| Transmission source address | | | | |
| Destination address | | | | |
| Next header | Extension header length | Type | | Remaining segment |
| Reservation | | | | |
| Home address | | | | |
| Payload proto | Header length | MH type | | Reservation |
| Check sum | | Status | K | Reservation |
| Sequence number | | Lifetime | | |
| Type | Data length | Key | | |

321 { rows 1–4 }
324 { rows 5–7 }
325 { rows 8–10 }
326 { row 11 }

291

| Version | Traffic class | Flow label | | |
|---|---|---|---|---|
| Payload length | | Next header | Pop limit | |
| Transmission source address | | | | |
| Destination address | | | | |
| Next header | Extension header length | Type | Remaining segment | |
| Reservation | | | | |
| Home address | | | | |
| Payload proto | Header length | MH type | Reservation | |
| Check sum | | Status | K | Reservation |
| Sequence number | | Lifetime | | |
| Type | Data length | Key | | |

321 { (rows 1–4)
324 { (rows 5–7)
325 { (rows 8–10)
326 { (row 11)

| MNP | Key | Registration flag | D flag |
|---|---|---|---|
| MNP 1 | Key 1 | 1 | 0 |
| MNP 2 | Key 2 | 1 | 1 |

| MNP | Key | Registration flag | D flag |
|---|---|---|---|
| MNP 2 | Key 2 | 1 | 0 |
| MNP 1 | Key 1 | 1 | 1 |

FIG. 34A

| HoA 3401 | CoA 3402 | MNP 3403 | Key 3404 | Lifetime 3405 | D flag 3406 |
|---|---|---|---|---|---|
| HoA (MR4) | CoA (MR4) | MNP 1 | Key 1 | 25 | 0 |
| HoA (MR5) | CoA (MR5) | MNP 2 | Key 2 | 30 | 0 |

FIG. 34B

| HoA | CoA | MNP | Key | Lifetime | D flag |
|---|---|---|---|---|---|
| HoA (MR4) | CoA (MR4) | MNP 1 | Key 1 | 25 | 0 |
| HoA (MR5) | CoA (MR5) | MNP 2 | Key 2 | 30 | 0 |
| HoA (MR4) | CoA (MR4) | MNP 2 | – | 25 | 1 |
| HoA (MR5) | CoA (MR5) | MNP 1 | – | 30 | 1 |

MOVING ROUTER, HOME AGENT, ROUTER POSITION REGISTRATION METHOD, AND MOVING NETWORK SYSTEM

This Application is a U.S. National Phase Application of PCT International Application PCT/JP2005/012367 Filed Jul. 5, 2005.

TECHNICAL FIELD

This invention relates to a method of making registration in a home agent of a mobile router in a moving network system which is composed of a moving network, including a movable terminal and a mobile router, and a home agent that manages a location of the mobile router.

BACKGROUND ART

Conventionally, a technology providing mobility of an entire network including a movable terminal and a router has been studied in IETF NEMO-WG ("Network Mobility (NEMO) Basic Support Protocol" written by Vijay Devarapalli et al.).

NEMO is technology which enables data accessing to a network including movable terminals and a router (hereinafter, referred to as "moving network"), by a mobile router and a home agent which manages the location of the mobile router. The mobile router is a device which connects a moving network and a global network such as Internet.

Technology of selecting an appropriate mobile router, depending on a type of data and a security condition etc., by including a plurality of mobile routers in one moving network, in the above moving network system (e.g., Japanese Patent Unexamined Publication No. 2003-283546) has been disclosed. In addition, technology for securing robustness by switching the mobile router used when there is load sharing by a plurality of mobile routers, or a failure or connectivity problem with a mobile router is known.

In this Japanese Patent Unexamined Publication No. 2003-283546, each mobile router decides whether to give permission for communication between a terminal working under itself and a global network, on the basis of a preset condition. In the case where the mobile router does not permit the communication, communication passing through an appropriate mobile router is realized by instructing the terminal to use another mobile router.

Hereinafter, a communication method between a terminal on a moving network in which a plurality of mobile routers exist, and a terminal on a global network will be explained by use of FIGS. 1 and 36.

The following explanation assumes use of IPv6, but it is also possible to configure a moving network system by use of IPv4.

FIG. 1 is a view which represents a configuration of a moving network system.

In FIG. 1, moving network 2, which includes mobile routers (MR) 4, 5, terminal 7 and local network 9, is connected to a global network 1 such as Internet through access routers (AR) 3. In addition, home agent (HA) 6 which manages locations of mobile routers 4, 5 and a network identifier of moving network 2, and terminal 8 are connected to global network 1.

Mobile routers 4, 5 acquire Care of Address (CoA) by use of a network prefix which is owned by a connection destination access router (AR). Mobile routers 4, 5 register Mobile Network Prefix (MNP), which is the network identifier set for itself, and Home Address (HoA) which is the unique address in the home network, in home agent 6, by means of a Binding Update packet.

Mobile router 4 or 5 publicizes MNP in a moving network. In addition, terminal 7 in the moving network prepares a terminal address for itself by use of publicized MNP.

Home agent 6 refers to the MNP which is included in the address of terminal 7 when a packet addressed to terminal 7 arrives, and obtains CoA of mobile router 4 or 5 in which the relevant MNP has been registered. Home agent 6 encapsulates the packet addressed to the address of terminal 7, and sets the CoA of mobile router 4 or 5 which in the address of that encapsulated packet, and sets up the address of home agent 6 in the address of the transmission source. Home agent 6 transmits the encapsulated packet.

Mobile router 4 or 5, which receives this encapsulated packet, takes out the packet addressed to the address of terminal 7 out of the capsule, and relays it to terminal 7 in moving network 2.

In addition, a packet is transmitted from terminal 7 to terminal 8 outside moving network 2. At this time, mobile router 4 or mobile router 5 intercepts and encapsulates this packet. Mobile router 4 or mobile router 5 sets the destination to be the address of home agent 6, and sets the transmission source to be the CoA of mobile router 4 or mobile router 5. Mobile router 4 or mobile router 5 transmits the encapsulated packet.

Home agent 6, which receives this encapsulated packet, takes out the packet addressed to terminal 8, from the capsule, and transmits it to terminal 8.

In this manner, mobile router 4 and mobile router 5 are connected to identical local network 9 and configure moving network 2 with the same MNP. In such case, terminal 7 prepares a terminal address for itself on the basis of this MNP, and thereby, both mobile routers 4, 5 can carry out a relay of communication between terminals 7 and 8, and therefore, it becomes possible to secure redundancy and realize load sharing.

FIG. 36 is a view which represents sequence at the time that mobile routers (MR) 4, 5 are registered in home agent (HA) 6.

Firstly, in mobile routers 4 and 5, the identical MNP1 is set to be the network prefix, in order to configure a single moving network 2.

Next, when mobile router (MR) 4 is connected to AR 3, mobile router 4 acquires the Care of Address CoA_MR4, and thereafter, it transmits a location registration request including MNP1 to home agent 6 (step S1001).

Home agent 6 registers mobile router (MR) 4 as the forwarding destination of MNP1 (step S1002), and thereafter, it returns a register confirmation response showing that location registration was successful to mobile router (MR) 4 (step S1003).

When mobile router 5 is connected to AR 3, location registration processing is carried out in the same manner (steps S1004 and S1006), and the forwarding destinations of MNP1 become mobile router 4 and mobile router 5 (step S1005).

Thereafter, in the case where mobile router 5 breaks away from moving network 2 (S1007), home agent 6 permits location registration for mobile router 5 in response to a location registration request from mobile router 5 (step S1008), and returns a response of registration approval (step S1009).

However, it is also conceivable that mobile router 5 acquires MNP1 by any means, but in actuality, it is not connected to moving network 2 to which mobile router 4 has been connected. In this case, there is a case where home agent 6 considers mobile router 5 as the forwarding destination of MNP1, even though mobile router 5 is not connected to moving network 2 in actuality, and transmits data addressed to terminal 7 to mobile router 5. In addition, in the case where mobile router 5 has broken away from moving network 2, it is not possible to know this unless home agent 6 receives a notification of breakaway from mobile router 5. On this account, home agent 6 judges that mobile router 5 is also a forwarding destination of MNP1, and transmits data addressed to terminal 7 to mobile router 5. In consequence, prior art had such a problem that there are cases where data does not reach terminal 7.

Furthermore, even in the case where mobile router 5 is connected to a different AR after it breaks away from moving network 2, mobile router 5 is registered as a router of MNP1. At this time, data addressed to terminal 7 is transmitted to mobile router 5 erroneously, and does not reach terminal 7. There is also the problem that, if an evil-minded user steals mobile router 5 and utilizes this, data addressed to terminal 7 is tapped at a place removed from moving network 2.

DISCLOSURE OF THE INVENTION

An objective of the present invention involving a situation where a plurality of mobile routers share the MNP of a moving network is to preclude a mobile router from being connected to a network using that MNP after the mobile router is no longer connected to the moving network. The invention is to preclude a packet addressed to a previously connected moving network from being sent, by this means. In addition, by precluding a connection to a network, it becomes impossible for an evil-minded user to illegally acquire a packet addressed to a moving network.

A router location registration method of the present invention has a step in which when a first mobile router has the network identifier specifying a moving network to which the first router is connected, the first mobile router generates a key that corresponds to that network identifier, and transmits a registration request packet, including the network identifier and the key, to a home agent which manages a location of the first mobile router, a step in which the home agent holds the network identifier and the key of the first mobile router linked with location information of the first router in the case where a network identifier which is identical to the network identifier of the first mobile router described in the received registration request packet has not yet registered, and registers the first mobile router as a main mobile router of the moving network, and sends a response of registration permission to the first mobile router, a step in which when the first mobile router receives the response of registration permission from the home agent, the first mobile router distributes the network identifier and the key to a second mobile router in the moving network, a step in which the second mobile router transmits the registration request packet including the network identifier and the key distributed from the first mobile router to the home agent which manages the location of the second mobile router, and a step in which when the home agent receives the registration request packet including a network identifier and a key which are identical to an already registered network identifier and key from the second mobile router, the home agent carries out registration or update of registered information of the second mobile router as the subsidiary mobile router of the moving network with which it shares a network identifier in the home agent.

By this means, a second mobile router which is not connected to the identical moving network cannot acquire the key from the first mobile router, and therefore even if it tries to register in the home agent with an identical network identifier, it cannot register. On this account, it is possible to prevent a packet to the moving network to which the first mobile router is connected, from being illegally acquired by a mobile router which is not connected to this moving network.

In addition, the router location registration method of the present invention further has a step in which information of lifetime for information to be registered is further included in the registration request packet and the home agent deletes registration of the registered first mobile router or second mobile router at the time that lifetime has passed, a step in which the first mobile router periodically updates the key which corresponds to the network identifier and the lifetime information within the lifetime and transmits an update request packet to the home agent, a step in which when the home agent receives the update request of the key from the registered first mobile router as the main mobile router, it updates the key which has been held and the remaining lifetime, changing them to the received key and lifetime, and sends a response of update permission to the first mobile router, a step in which, when the first mobile router receives the response of update permission from the home agent, the updated key is distributed again to the second mobile router in the moving network, and a step in which the second mobile router transmits the update request packet including new key and lifetime information distributed from the first mobile router, to the home agent.

By this means, even if a second mobile router which was connected to the same moving network as the first mobile router becomes disconnected and connects to another network, attempts to acquire a packet to a previous moving network from the home agent, it is not possible to acquire this, since time has expired for registration with the home agent and registration has been cancelled. In this manner, it becomes possible to prevent a mobile router outside the moving network from sharing that network identifier and acquiring a packet addressed to that moving network.

In addition, a router location registration method of the present invention has a step in which when a first mobile router holds a network identifier specifying the moving network to which the first mobile router is connected, the first mobile router transmits a registration request packet including that network identifier to the home agent which manages the location of the first mobile router, a step in which the home agent sends a response of registration disapproval to the first mobile router in the case where a network identifier which is identical to the network identifier of the first mobile router described in the received registration request packet, has been already registered, and in the case where the network identifier has not yet been registered in the home agent, the home agent generates a key which corresponds to the network identifier and holds the network identifier and the key linked with location information of the first mobile router, registers the first mobile router as a main mobile router of the moving network, and includes the key in a response message of registration permission which it sends to the first mobile router, a step in which when the first mobile router receives the response of registration permission from the home agent, the first mobile router distributes the network identifier and the key to a second mobile router in the moving network, a step in which the second mobile router transmits a registration request packet including the network identifier and the key distributed from the first mobile router to the home agent which manages a location of the second mobile router, and a step in which when the home agent receives the registration request packet including a network identifier and a key which are identical to already registered network identifier and key from the second mobile router, the home agent carries out registration or update of registered information of the second mobile router as the subsidiary mobile router which shares the network identifier.

By this means, a second mobile router which is not connected to the identical moving network cannot acquire the key from the first mobile router, and therefore, even if it is tried to register with the home agent with the identical network identifier as the first mobile router, it is not possible to register it. On this account, it is possible to prevent a packet to the moving network to which the first mobile router is connected from being illegally acquired by a mobile router which is not connected to this moving network. In addition, the present invention generates a key in the home agent, and therefore, it is possible to reduce the burden on a mobile router to generate a key, and it becomes possible to reduce cost and size of the mobile router.

In addition, the router location registration method of the present invention further has a step in which lifetime information for information to be registered is also included in the registration request packet and the home agent deletes registration of the registered first mobile router or second mobile router when lifetime has expired, a step in which the first mobile router periodically transmits an update request packet including lifetime information to the home agent within the lifetime, a step in which the home agent periodically updates the key which corresponds to the network identifier and, when it receives the update request from the first mobile router, distributes the updated key, a step in which when the first mobile router receives the updated key from the home agent, the first mobile router distributes the key to a second mobile router in the moving network, and a step in which the second mobile router transmits an update request packet including the new key and lifetime information distributed from the first mobile router to the home agent.

By this means, even if the second mobile router, which was connected to the identical moving network, becomes disconnected and thereafter, an evil-minded person connects the second mobile router to another network and tries to acquire a packet addressed to the previous moving network from the home agent, it is not possible to acquire the key since lifetime has expired so that registration has been cancelled. In this manner, it becomes possible to prevent a mobile router outside the moving network but which shares the network identifier from acquiring a packet to that moving network.

In addition, the router location registration method of the present invention further has a step in which when distribution of the network identifier and the key from the first mobile router to the second mobile router has stopped for the period of lifetime or more, the second mobile router acts as the main mobile router and generates only a key which corresponds to the network identifier, or both a new network identifier and key, and transmits a registration request packet including the network identifier and the key to the home agent.

By this means, even if the main mobile router becomes disconnected from the mobile router, the second mobile router, which is a subsidiary mobile router, sets itself to be the main mobile router and to register itself as such with the home agent, and therefore, it becomes possible to receive a packet addressed to the moving network continuously by a remaining subsidiary mobile router.

In addition, the router location registration method of the present invention further has a step in which the second mobile router acts as the main mobile router and transmits the registration request packet including the network identifier, in the case where distribution of the key from the first mobile router has stopped for the duration of the lifetime or more.

By this means, even if the main mobile router becomes disconnected from the mobile router, the second mobile router which is a subsidiary mobile router sets itself to be the main mobile router to be registered in the home agent, and therefore it becomes possible for the remaining subsidiary mobile router to receive a packet addressed to the moving network without break.

A mobile router of the present invention is a mobile router which holds a network identifier specifying a moving network to which itself is connected, and which is equipped with a key generation section which periodically generates and updates a key which corresponds to the network identifier, a main mobile router registration section which transmits a registration request packet including registration information composed of location information of the mobile router, the network identifier and the generated key, status information showing that it is the main mobile router in the moving network, and lifetime of the registration information, to a home agent which manages a location of the moving network, a main mobile router registration update section which transmits a registration request packet that requests for update of registration to the home agent every time the key is updated by the key generation section, and an identifier distribution section which periodically distributes an identifier distribution packet including the network identifier and the generated key, to another mobile router in the moving network.

By this means, the main mobile router can distribute a common key to another mobile router which is connected to the moving network, and therefore, it becomes possible to use this key as a key for registering with the home agent.

In addition, a mobile router of the present invention is a mobile router which holds a network identifier specifying the moving network to which it is connected, and which is equipped with a main mobile router registration section which transmits a registration request packet including registration information composed of location information, the network identifier, status information showing that it is the main mobile router in the moving network, and lifetime of the registration information, to the home agent which manages the location of the mobile router, and an identifier distribution section which periodically distributes an identifier distribution packet including a key that corresponds to the network identifier included in registration permission given from the home agent in response to the registration request packet, and the network identifier, to another mobile router in the moving network.

By this means, the main mobile router can distribute a common key to another mobile router which is connected to the moving network, and therefore, it becomes possible to use this key as a key for registering with the home agent.

In addition, in the mobile router of the present invention, the identifier distribution section further includes lifetime of registration information in the identifier distribution packet.

By this means, when registration update is not carried out within a period of lifetime after the mobile router is registered in the home agent, the registration becomes invalid, and therefore, it is possible to prevent a key from continuing to be used illegally.

In addition, a mobile router of the present invention is equipped with a network identifier sharing section which acquires a network identifier specifying a moving network and a key that corresponds to the network identifier, by an identifier distribution packet distributed from another mobile router in the moving network to which it is connected, a subsidiary mobile router registration section which transmits a registration request packet including the distributed network identifier, a key, status information showing that it is a mobile router which acquired the network identifier from another mobile router, and information of its location, to the home agent which manages the location of that mobile router, and a subsidiary mobile router registration update section which transmits a registration request packet requesting the home agent to update registration information in the case where distribution of the updated key is received from another mobile router by the identifier distribution packet.

By this means, when a key that is registered is updated, even the subsidiary mobile router can acquire that updated key, and therefore, it becomes possible to continue to register to the home agent continuously.

In addition, the mobile router of the present invention is further equipped with a status management section which sets itself to be the main mobile router of a moving network or cancels this setting, a key generation section which generates a key that corresponds to a network identifier, and a main mobile router registration section which transmits a registration request packet including registration information composed of information of its location, the network identifier, the generated key, status information showing that it is the main mobile router, and lifetime of the registration information, to the home agent which manages the location of that mobile router, and when the status management section does not receive a identifier distribution packet from another mobile router for a period of predetermined time, sets itself to be the main mobile router, instructs the key generation section to generate a key, and instructs the main mobile router registration section to transmit a registration request packet including the generated key to the home agent.

By this means, even if the main mobile router becomes disconnected from the mobile router, a subsidiary mobile router registers itself as a main mobile router with the home agent, and therefore, it becomes possible to receive a packet addressed to the moving network continuously through remaining subsidiary mobile routers.

In addition, the mobile router of the present invention is further equipped with a status management section which sets itself to be the main mobile router of a moving network or cancels this setting, and a main mobile router registration section which transmits a registration request packet including registration information composed of information of its location, the network identifier, status information showing that it is the main mobile router, and lifetime of the registration information, to a home agent which manages the location of that mobile router, and when the status management section does not receive an identifier distribution packet from another mobile router for a period of predetermined time, the status management section sets itself to be the main mobile router, and instructs the main mobile router registration section to transmit a registration request packet.

By this means, even if the main mobile router becomes disconnected from the mobile router, a subsidiary mobile router registers itself as a main mobile router with the home agent, and therefore, it becomes possible for the remaining subsidiary mobile router to receive packets addressed to the moving network without a break.

In addition, the identifier distribution packet, which is transmitted and received by the mobile routers of the present invention, includes lifetime information specifying lifetime of the registration information, and the status management section sets up a predetermined time period to be the lifetime.

By this means, a subsidiary mobile router which receives the identifier distribution packet can know the main mobile router's lifetime which is registered in the home agent, and therefore, if that lifetime has expired without reception of an identifier distribution packet, it is judged that the main mobile router has become disconnected, and it is possible for the subsidiary mobile router to register itself as the main mobile router.

A home agent of the present invention has a registration information receiving section which receives a registration request packet including registration information composed of location information of a mobile router, a network identifier specifying a moving network, status information showing whether the mobile router is the main mobile router of the moving network or not, a key that corresponds to the network identifier, and lifetime of the registration information, a registration permission section which decides whether to register the moving network in response to the registration request, a registration information storage section which stores registration information of mobile routers for which registration was permitted by the registration permission section, and a forwarding destination selection section which selectively transfers data addressed to a terminal in the moving network to one of plural mobile routers registered in the registration information storage section, and deletes registration information of a moving network from the registration information storage section after the lifetime passed.

By this means, the home agent decides whether to register a mobile router by checking the key which exists in the registration information, and therefore, it is possible to reject a request for registration from a mobile router having no key. In addition, since there is an lifetime for registration, it is possible to prevent a mobile router which becomes disconnected from continuing to be registered. In addition, since it is possible to verify whether a mobile router which shares a network identifier exists in the moving network, it is possible to correctly relay data addressed to a terminal in the moving network.

In addition, a home agent of the present invention has a registration information receiving section which receives a registration request packet including registration information composed of location information of a mobile router, a network identifier specifying a moving network, and status information showing whether the mobile router is the main mobile router of the moving network or not, and lifetime of the registration information, a registration permission section which decides whether to register the moving network in response to the registration request, a key generation section which generates a key that corresponds to the network identifier of the mobile router for which registration was permitted by the registration permission section, a registration response section which gives the key to the mobile router which requested registration together with registration permission, a registration information storage section which stores the registration information and the key together, and a forwarding destination selection section which selectively transfers data addressed to a terminal in the moving network to one of plural mobile routers registered in the registration information storage section, and deletes registration information and a key from the registration information storage section after their lifetime has expired.

By this means, the home agent sends the key only to a mobile router for which registration is permitted, and therefore, it is possible to reject registration from a mobile router which is identical to the mobile router which acquired the key but is not connected to the moving network. In addition, since there is an lifetime of registration, it is possible to prevent a mobile router which has become disconnected from continuing to be registered. In addition, since it is possible to verify whether a mobile router which shares a network identifier exists in the moving network, it is possible to correctly relay data addressed to a terminal in the moving network.

In addition, the registration permission section of a mobile router to the home agent of the present invention enables registration and update of registration in the case where a mobile router is the main mobile router and there is no other main mobile router with the same network identifier registered in the registration information storage section, and in the case where the mobile router is not the main mobile router and where the network identifier and the same network identifier as the key and the main mobile router having the same key are included in the registration request packet.

By this means, the home agent can prevent double registration of a main mobile router. In addition, a subsidiary mobile router can be prevented from being registered in the home agent when a main mobile router is not registered.

The router location registration method of the present invention also has a step in which, when it is assumed that a network identifier which was registered by the first mobile router in the home agent is set to be the first network identifier and a key is set up as a first key, a third mobile router which is connected to the moving network to which the first mobile router is connected acquires a third network identifier and generates a third key that corresponds to the third network identifier and transmits a registration request packet including the third network identifier and the third key to the home agent, a step in which when the home agent receives the registration request packet from the third mobile router, the home agent stores the third network identifier and the third key linked with location information of the third mobile router, registers the third mobile router as a main mobile router, and sends a response giving registration permission to the third mobile router, a step in which when the third mobile router receives the response giving registration permission from the home agent, the third mobile router distributes the third network identifier and the third key to a mobile router in the moving network, a step in which the first mobile router transmits a registration request packet including the third network identifier and the third key distributed from the third mobile router, in addition to the first network identifier and the first key which it has, to the home agent, and a step in which when the home agent receives the registration request packet from the first mobile router, the home agent updates registration of the first mobile router to be the main mobile router of the moving network specified by the first network identifier and a subsidiary mobile router of the moving network specified by the third network identifier, and sends a response giving registration permission to the first mobile router.

By this means, each mobile router can configure its own moving network using its own network identifier, and in the case where a plurality of moving networks are combined, each mobile router can register the network identifier of another mobile router, while maintaining its own network identifier.

In addition, the router location registration method of the present invention further has a step in which when the first mobile router and the third mobile router distribute the network identifier and a key which they hold, further distribute the relevant network identifier and lifetime of the key, and when the lifetimes of the network identifier and the key the first through the third mobile routers have received have expired, they respectively transmit to the home agent a registration request packet from which the network identifier and a key whose lifetime has expired has been removed.

By this means, a mobile router detects that another mobile router has become disconnected and notifies this to the home agent, and therefore, it is possible to prevent data from being transmitted from the home agent to a mobile router which is not connected.

A mobile router of the present invention holds a network identifier specifying the moving network to which it is connected, and is equipped with a key generation section which periodically generates and updates a first key that corresponds to a first network identifier held by itself, a main mobile router registration section which transmits a registration request packet including registration information composed of information of its location, the network identifier, the generated first key, status information showing that it is a main mobile router, and lifetime of the registration information, to the home agent which manages the location of that mobile router, an identifier distribution section which periodically distributes an identifier distribution packet including a first network identifier and a first key to another mobile router in the moving network, a network identifier sharing section which acquires a second network identifier and a second key that corresponds to the second network identifier which were distributed from another mobile router in the moving network, and a plural network identifier simultaneous registration section which transmits a registration request packet including the distributed second network identifier, second key, status information showing that the second network identifier was acquired from another mobile router, first network identifier, first key, and information showing that it is the main mobile router of the moving network specified by the first network identifier, to the home agent.

By this means, each mobile router can configure a moving network by itself using a network identifier it has, and as well each mobile router can register the network identifier of another mobile router while keeping its own network identifier.

As above, according to a router location registration method of the present invention, it is possible to prevent erroneous distribution and tapping of data in a moving network in which robustness and load sharing have been realized by having plural mobile routers which are connected to each other configure one moving network.

BRIEF DESCRIPTION OF THE DRAWINGS

FIG. 22 is a view which shows location information to be stored in a location information storage section of a mobile router in the embodiments 1 through 3 of the present invention.

FIG. 23 is a view which shows information to be stored in a MNP/key storage section of the mobile router in the embodiments 1 and 2 of the present invention.

FIG. 24A is a view which shows information to be stored in a location information/MNP/key storage section of the home agent in the embodiments 1 and 2 of the present invention.

FIG. 24B is a view which shows information to be stored in a location information/MNP/key storage section of the home agent in the embodiments 1 and 2 of the present invention.

FIG. 25 is a view which shows information to be stored in a MR/MNP-linking storage section of the home agent in the embodiments 1 and 2 of the present invention.

FIG. 27 is a view which shows a format of a location registration response packet in the embodiment 2 of the present invention.

FIG. 33A is a view which shows information to be stored in a MNP/key storage section of the mobile router in the embodiment 3 of the present invention.

FIG. 33B is a view which shows information to be stored in a MNP/key storage section of the mobile router in the embodiment 3 of the present invention.

FIG. 34A is a view which shows information to be stored in a MR/MNP-linking storage section of the home agent in the embodiment 3 of the present invention.

FIG. 34B is a view which shows information to be stored in the MR/MNP-linking storage section of the home agent in the embodiment 3 of the present invention.

Figure 1:
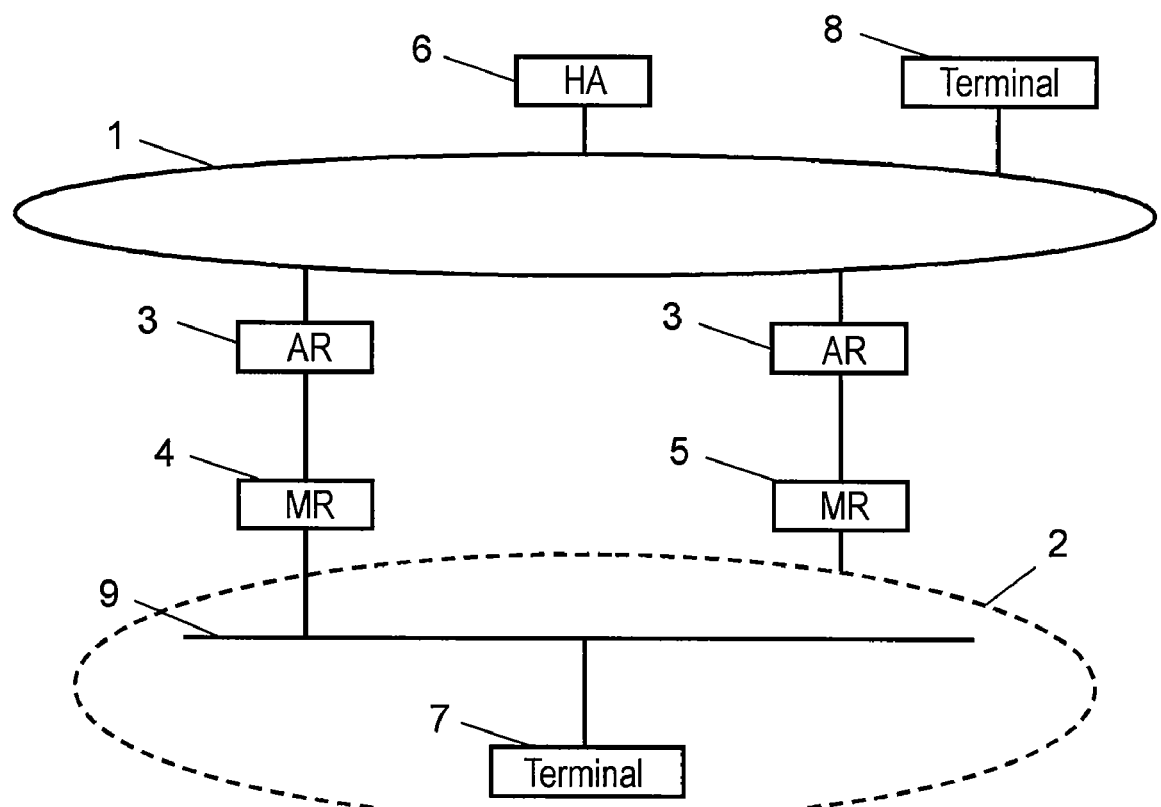
FIG. 1 is a block diagram of a moving network system in an embodiment of the present invention.

DESCRIPTION OF REFERENCE NUMERALS AND SIGNS 1 global network
2 moving network
3 access router
4,5 mobile router
6 home agent
7,8 terminal
9 local area network
401 external network IF
402 packet transmission/reception/relay processing section
403 internal network IF
404,2901 location registration processing section
405,2902 MNP distribution/processing section
406,2903 key generation/processing section
407,2905 location information storage section
408,2906 MNP/key storage section
409,2904 shared MNP management section
410 status management section
411 status storage section
601 home network IF
602 MR registration permission section
603 location information management section
604 packet transmission/reception/relay processing section
605 forwarding destination MR selection section
606 location information/MNP/key storage section
607 MR/MNP-linking storage section
608 key generation processing section

DETAILED DESCRIPTION OF PREFERRED EMBODIMENTS

Hereinafter, embodiments of the present invention will be explained over referring to drawings.

Embodiment 1

FIG. 1 is a view which shows a configuration of a network in an embodiment of the present invention, this configuration being identical to a conventional one. However, functions of mobile routers 4, 5 and home agent 6 are different from those in a conventional example.

Figure 2:
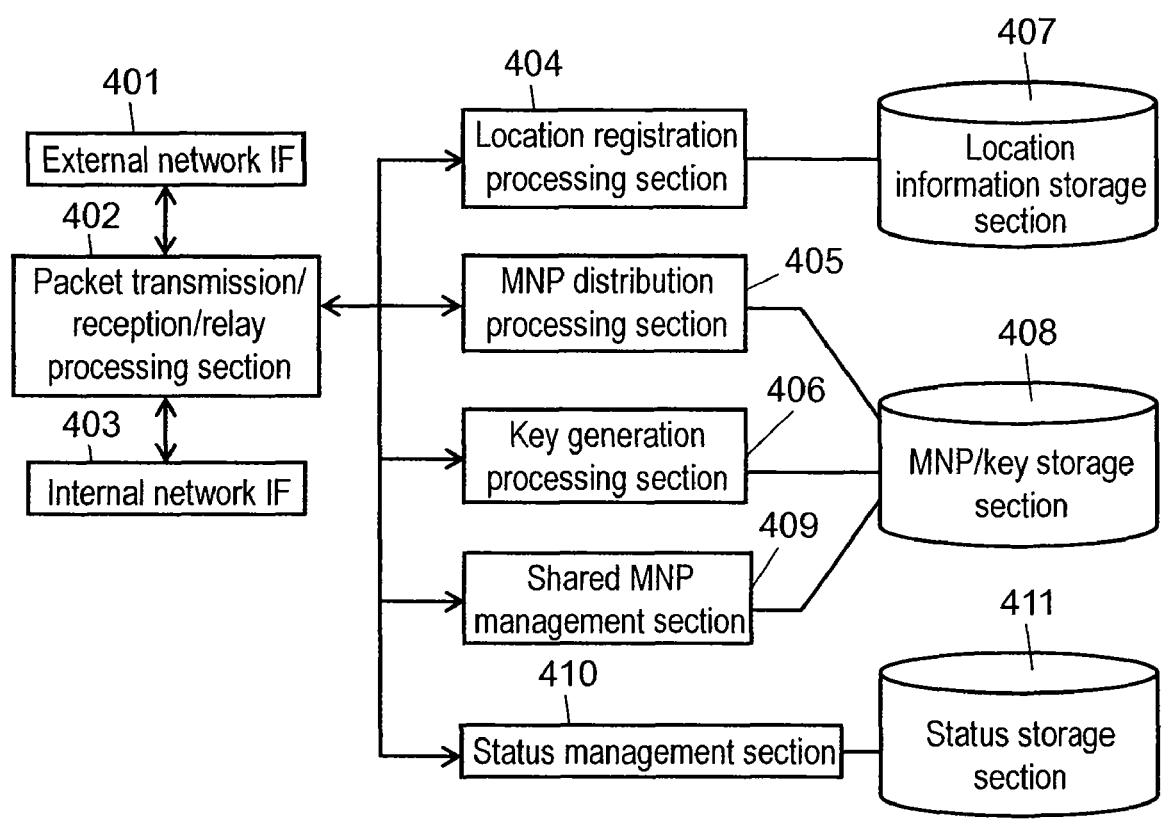
FIG. 2 is a block diagram of a mobile router in the embodiment 1 of the present invention.

FIG. 2 is a view which shows a configuration of mobile routers 4, 5.

In FIG. 2, internal network interface 401 is a device which carries out physical layer processing and data link layer processing in communication between a terminal device and another router connected to local network 9. External network interface 403 is a device which carries out physical layer processing and data link layer processing for connecting to an access router and a base station, an access point, etc., which becomes a connection point to an external network such as global network 1. Packet transmission/reception/relay processing section 402 is a device which carries out relay or reception processing of a packet received from each interface, and processing of IP and higher level layers (TCP, UDP, ICMP) than IP in case of transmitting a packet from a mobile router.

Location information storage section 407 is a device which stores location information such as an address of home agent 6 (HA), a home address of itself (HoA) and Care of Address (CoA). FIG. 22 is a view which shows a data configuration of information to be stored in location information storage section 407. In FIG. 22, an address of home agent 6 (here, an address of home agent 6) is stored in HA field 2401, and a home address (HoA) of mobile router 4 is stored in HoA field 2402, and a care of address (CoA) of mobile router 4 is stored in CoA field 2403. This information is used on the occasion of transmitting a location registration request packet to home agent 6 and relaying data of moving network 2 between location information storage section 407 and home agent 6.

MNP/key storage section 408 is a device which stores MNP and a key that corresponds to it.

FIG. 23 is a view which shows a data configuration of information to be stored in MNP/key storage section 408.

In FIG. 23, the MNP of the moving network 2 to which the mobile router is connected (here, MNP1) is stored in MNP field 2601, a key which is a random numeral that corresponds to MNP1 is stored in key field 2602, and information of whether registration of MNP 1 by home agent 6 succeeded or not is indicated by registration flag 2603, 1 in the case where it succeeded and 0 in the case where it was failed. MNP, which is stored in MNP field 2601, is set by manual input from a user or by terminal software, transfer from an external memory, or allocation from the home agent through a network (DHCP etc.). In addition, registration flag 2603 is used by packet transmission/reception/relay processing section 402 for judging whether a packet shall be relayed or not. In addition, registration flag 2603 is used in order to judge whether MNP shall be distributed to a moving network by MNP distribution processing section 405, or in order to judge whether a key shall be updated by key generation processing section 406.

Location registration processing section 404 stores Care of Address acquired from access router 3, in location information storage section 407. In addition, location registration processing section 404 carries out registration with home agent 6 of location information and network identifier information stored in location information storage section 407. This location registration processing section 404 corresponds to a main mobile router registration section of the present invention in the case where it functions as the main mobile router. Location registration processing section 404 corresponds to a subsidiary mobile router registration section of the present invention in the case where it functions as a subsidiary mobile router. In addition, location registration processing section 404 carries out updating of registration in response to a notification of time expiration from a timer which is not shown in the figure. At this time the location registration processing section corresponds to a main mobile router registration update section, or a subsidiary mobile router registration update section.

MNP distribution processing section 405 is a device which distributes MNP and a key to another mobile router in a moving network. In addition, key generation processing section 406 is a device which generates a key which is a random number that corresponds to MNP, stores it in MNP/key storage section 408 linked with MNP, or updates the key periodically. This MNP distribution processing section 405 corresponds to an identifier distribution section of the present invention, and key generation processing section 406 corresponds to a key generation section of the present invention.

Shared MNP management section 409 is a device which manages an MNP and a key received from another mobile router, and is a device which stores and updates the MNP and the key in the MNP/key storage section 408. This corresponds to a network identifier sharing section of the present invention.

Status management section 410 is a device decides whether that mobile router shall operate as the main mobile router of the moving network or operate as a subsidiary mobile router, and stores its operation status as a main mobile router or as a subsidiary mobile router in status storage section 411. The main mobile router is a mobile router which holds an MNP, and has authority for generating and updating a key. The subsidiary mobile router is a mobile router which acquires MNP from the main mobile router, and does not have authority for generating a key by itself.

Next, operations of mobile routers 4, 5 of the present invention will be explained by use of drawings.

Figure 3:
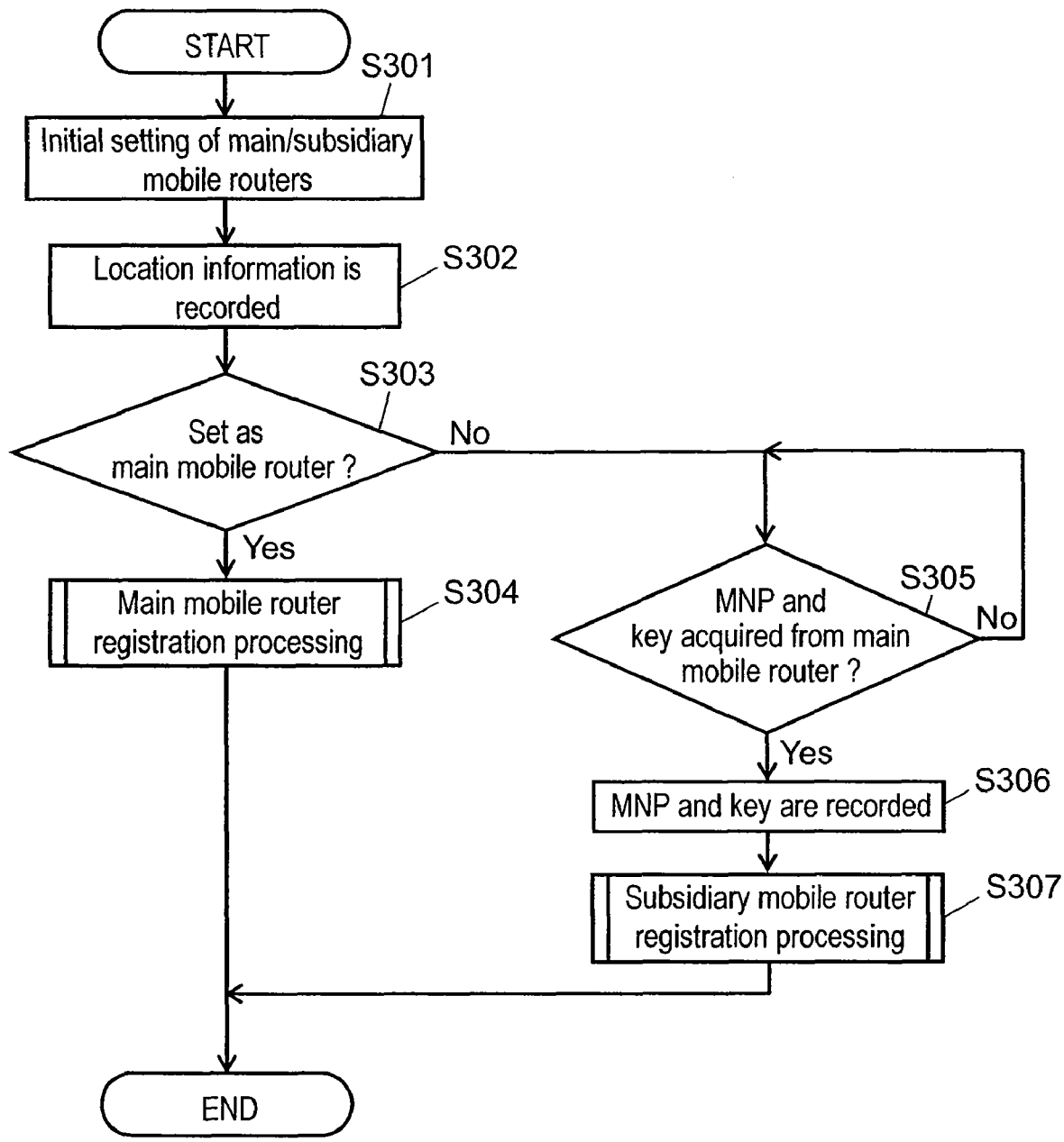
FIG. 3 is a flow chart which shows initial registration processing of the mobile router in the embodiment 1 of the present invention.

FIG. 3 is a flow chart which shows processing of initial registration to home agent 6.

Firstly, in initial setting, status management section 410 carries out judgment of its operation mode to determine whether it shall operate as the main mobile router or as a subsidiary mobile router, and that information is stored in status storage section 411 (step S301).

Figure 14:
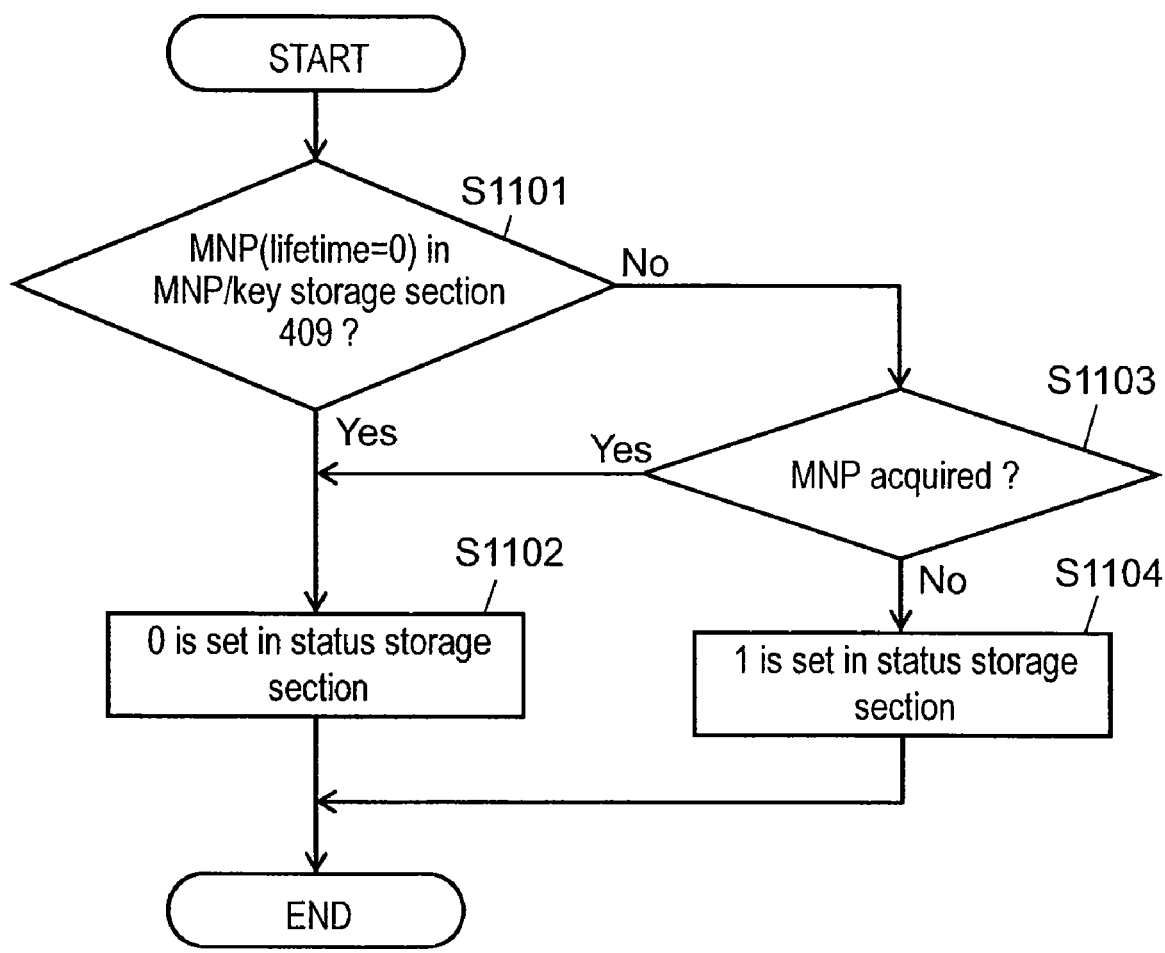
FIG. 14 is a flow chart which shows judgment processing of an operation mode of the mobile router in the embodiment 1 of the present invention.

This judgment processing, which is carried out by status management section 410 (step S301), will be explained by use of FIG. 14.

Status management section 410 checks whether or not an already set MNP (a value of the registration flag is 0) exists in MNP/key storage section 409 (step S1101), and in the case where MNP (here, assumed to be MNP1.) has been stored, "0" is set up to status storage section 411 indicating that operation as the main mobile router is possible (step S1102).

On the one hand, in the case where an MNP does not exist, shared MNP management section 409 judges whether an MNP can be acquired from home agent 6 or a DHCP server (step S1103), and in the case where it can be acquired, it moves to step S1102.

Shared MNP management section 409 judges that it is impossible to operate as the main mobile router in the case where it is not possible to acquire MNP, and sets status storage section 411 to "1" (step S1104).

Next, location registration processing section 404 registers the CoA which was obtained from AR3 in location information storage section 407 (step S302).

Next, status management section 410 judges whether or not status storage section 411 has stored the indication that this mobile router can operate as the main mobile router (step S303), and carries out main mobile router registration processing (step S304) in the case where it has stored that this mobile router can operate as the main mobile router.

Figure 4:
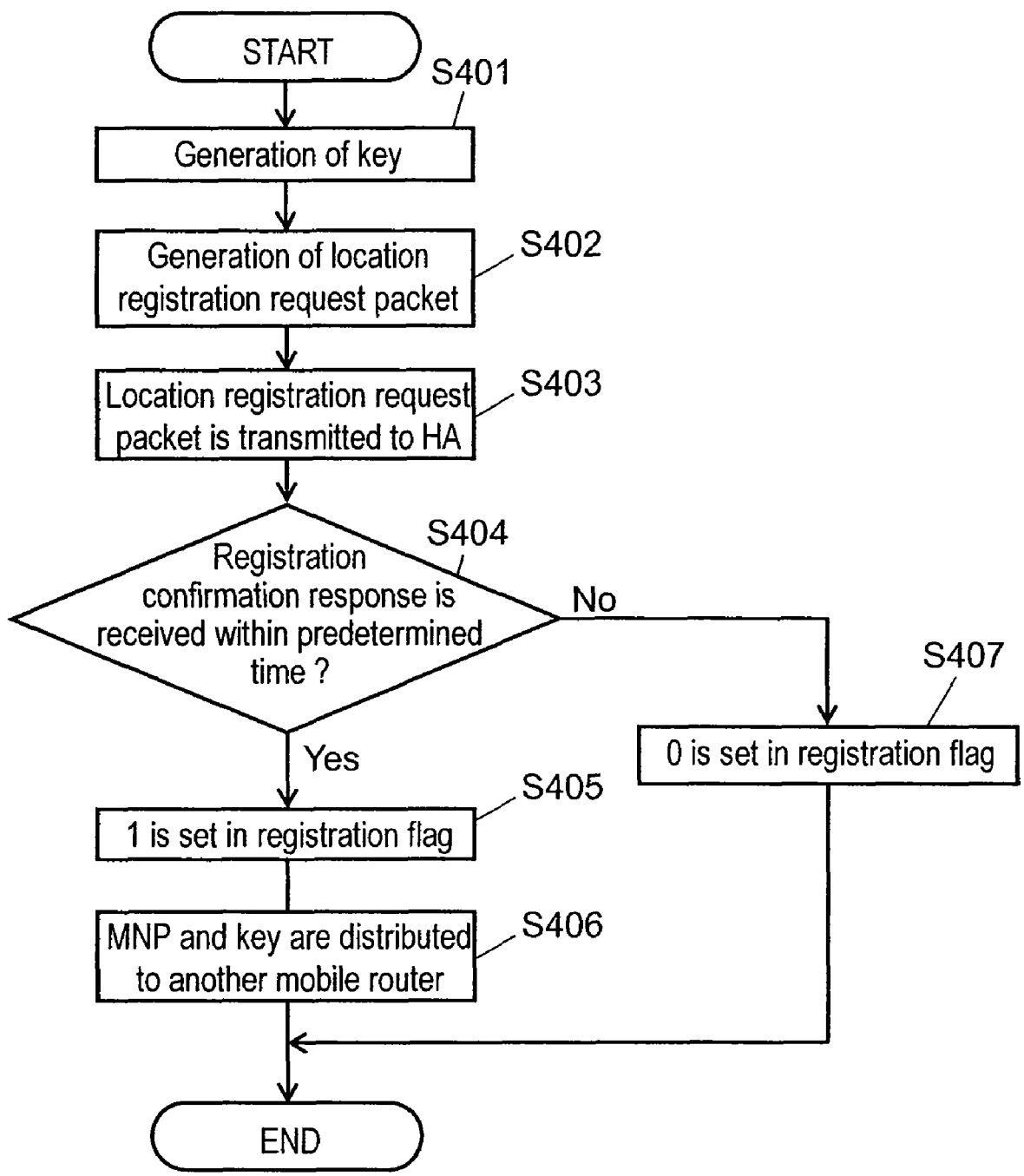
FIG. 4 is a flow chart which shows registration processing of a main mobile router in the embodiment 1 of the present invention.

This main mobile router registration processing will be explained referring to FIG. 4.

Firstly, key generation processing section 406 generates a key which corresponds to MNP, and stores it in MNP/key storage section 408 (step S401).

Next, location registration processing section 404 reads out the MNP and the key from the MNP/key storage section 408, and further reads out the address of the home agent and the CoA from location information storage section 407, and generates a location registration request packet using them (step S402).

Figure 26:
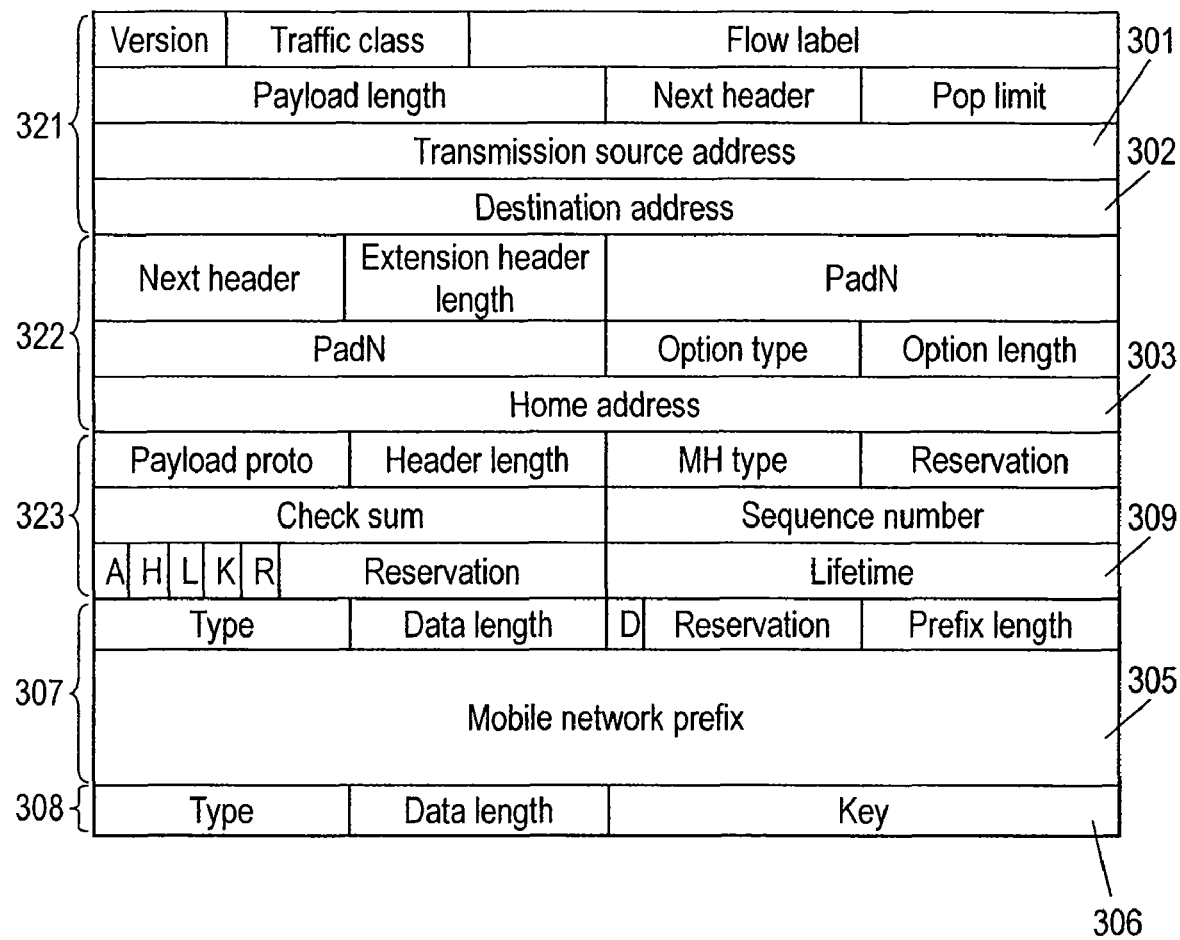
FIG. 26 is a view which shows a format of a location registration request packet in the embodiment 1 of the present invention.

An example of a format of the location registration request packet is shown in FIG. 26. In this format, D flag 304, which shows that this mobile router is the main mobile router, is added to mobile network prefix option 307 of a binding update packet defined in the document "Network Mobility (NEMO) Basic Support Protocol" and key option 308 is further added thereto. This D (Delegated) flag 304 is set to be 0 in the case where the mobile router at the transmission source is the main mobile router and is set to be 1 in the case where it is a subsidiary mobile router. IPv6 header 321, destination option header 322, and binding update 323 are as defined in the case of a binding update packet.

Location registration processing section 404 sets the CoA [MR4] as transmission source address 301, sets the address of home agent 6 as destination address 302, and sets HoA (MR4) as home address 303.

In addition, location registration processing section 404 sets D flag 304 to be 0, in order to show that this mobile router is the main mobile router, sets MNP1 in mobile network prefix field 305, and sets key 1 (MNP1) in key field 306. In addition, location registration processing section 404 sets "30" in lifetime 304 in this embodiment. The time which is set in this lifetime 304, becomes the lifetime registration information at the time that the home agent registers this information of this mobile router.

Next, packet transmission/reception/relay processing section 402 transmits a location registration request packet through external network IF 401 (step S403).

Next, when packet transmission/reception/relay processing section 402 receives a registration confirmation response from home agent 6 within a predetermined time period (step S404), MNP distribution processing section 405 sets registration flag 2603 of MNP/key storage section 408 to be "1" (step S405), and MNP distribution processing section 405 distributes the MNP1 and key1 where the registration flag in MNP/key storage section 408 is "1" to the other mobile routers in moving network 2 (step S406). Any format data may be used for this distribution of MNP and key, but in this embodiment, a router advertisement packet of ICMPv6 is used.

Figures 28, 29:
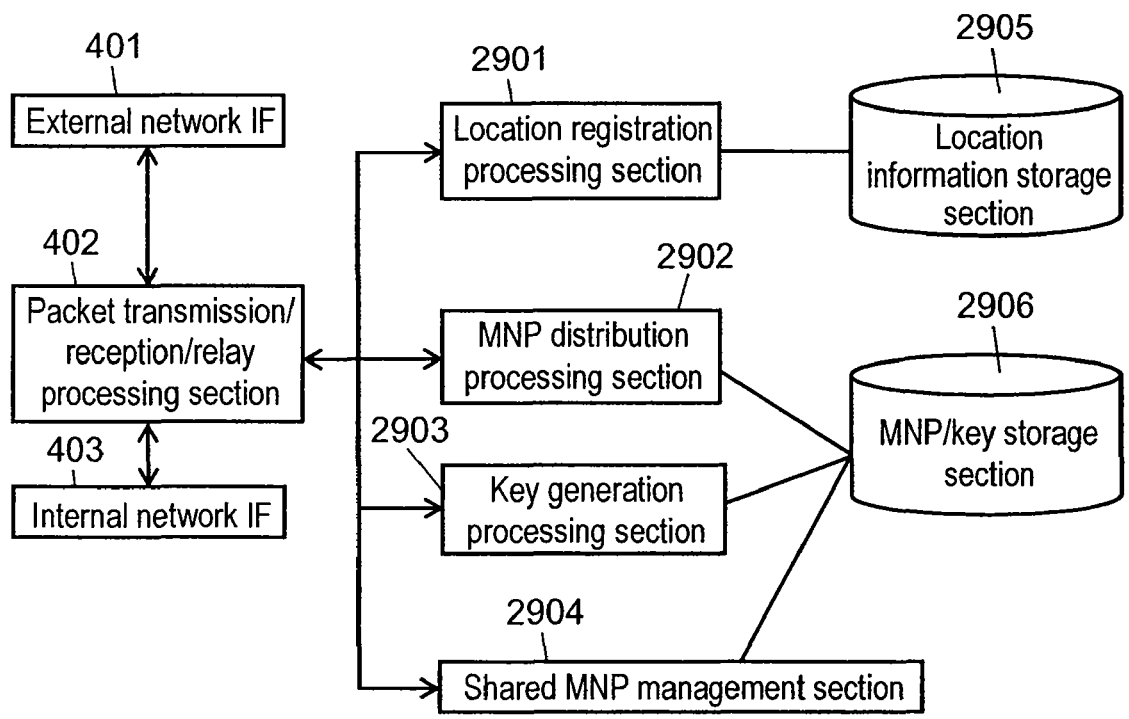
FIG. 28 is a view which shows a format of a router advertisement packet for MNP distribution in the embodiments 1 through 3 of the present invention.
FIG. 29 is a block diagram of a mobile router in the embodiment 3 of the present invention.

FIG. 28 shows an example of a format of a router advertisement packet for MNP distribution. In this format, key option 326 was added to a router advertisement packet as defined in RFC2461. Router advertisement 327 and prefix option 328 are the same as defined in RFC2461.

MNP distribution processing section 405 sets the address of mobile router 4 (link local scope address) as transmission source address 311, and sets a multicast address addressed to all routers in a link as destination address 312. In addition, it sets MNP1 in prefix field 313, and sets key1 (MNP1) in key field 314. Further, MNP distribution processing section 405 sets the lifetime for a key to be regular lifetime 315. This lifetime is the same as the lifetime 309 of the location registration request packet shown in FIG. 26.

In addition, in step S404, in the case where packet transmission/reception/relay processing section 402 does not receive a registration confirmation response for a period of predetermined time, or in the case where it receives a registration confirmation response which notifies that registration is impossible, MNP distribution processing section 405 sets registration flag of MNP/key storage section 408 to be "0" (step S407). In case of a registration confirmation response (registration disapproval), MNP distribution processing section 405 transmits a registration confirmation request again, or changes MNP and transmits a registration confirmation request.

The foregoing is the main mobile router registration processing (step S304).

In this manner, when it was judged in step S303 that a mobile router is the main mobile router, the mobile router generates a key which corresponds to the MNP and carries out initial registration of MNP and the key together, with the home agent.

Next, in step S303, when status management section 410 checks status storage section 411 and judges that it is impossible for this mobile router to operate as the main mobile router, it notifies this to shared MNP management section 409. Shared MNP management section 409 checks whether it has acquired an MNP and key from the main mobile router or not (step S305), and waits until it acquires an MNP and key. In the case where shared MNP management section 409 has acquired an MNP and key, shared MNP management section 409 stores MNP and key in MNP/key storage section 408 (step S306).

Next, registration processing of a subsidiary mobile router is carried out (step S307).

Figure 5:
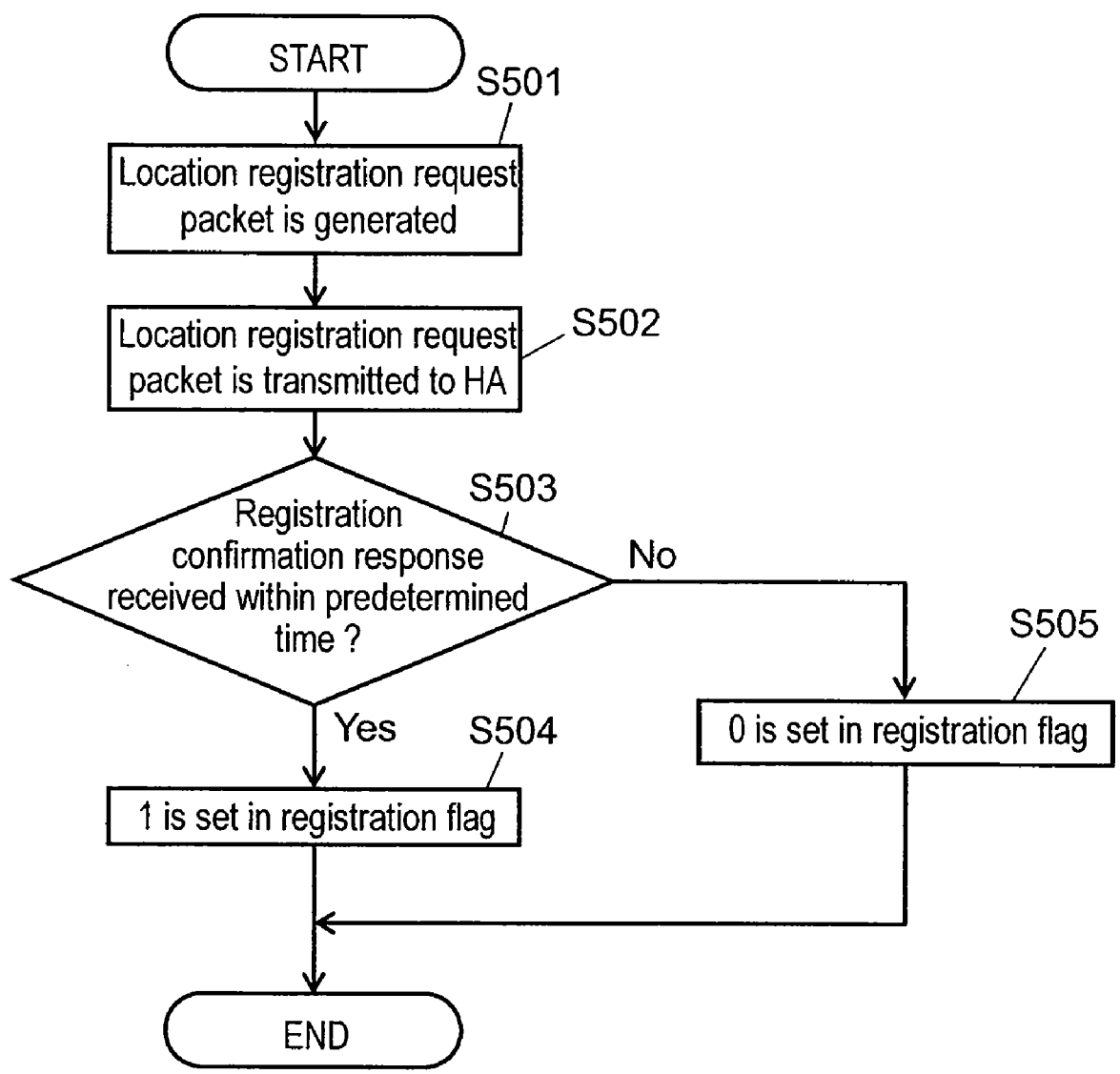
FIG. 5 is a flow chart which shows registration processing of a subsidiary mobile router in the embodiment 1 of the present invention.

This subsidiary mobile router registration processing will be explained referring to FIG. 5.

Firstly, location registration processing section 404 reads out MNP and key from MNP/key storage section 408, and further reads out an address of the home agent and CoA from location information storage section 407, and generates a location registration request packet by use of them (step S501). The content of this location registration request packet is identical to that at the time of registering it as the main mobile router, except that D flag 304 is set to be "1", which shows that it is a subsidiary mobile router. That is, MNP1 is set in mobile network prefix field 305, and key1 (MNP1) is set up in key field 306.

Next, packet transmission/reception/relay processing section 402 transmits a location registration request packet through external network IF 401 (step S502).

Next, when packet transmission/reception/relay processing section 402 receives a registration confirmation response from home agent 6 within the predetermined time period (step S503), MNP distribution processing section 405 sets registration flag 2603 of MNP/key storage section 408 to be "1" (step S504). In addition, in the case where packet transmission/reception/relay processing section 402 does not receive the registration confirmation response within the predetermined time period, MNP distribution processing section 405 sets registration flag 2603 of MNP/key storage section 408 to be "0", and deletes the MNP and key acquired from the main mobile router, from MNP/key storage section 408 (step S505).

The foregoing is the subsidiary mobile router registration processing.

In this manner, when it is judged that a mobile router is a subsidiary mobile router in step S303, the mobile router acquires a key which corresponds to MNP from the main mobile router and carries out initial registration of MNP and the key in pairs, with home agent 6.

Next, a mobile router's updating of registration information in normal operation after initial registration will be explained below.

Figure 6:
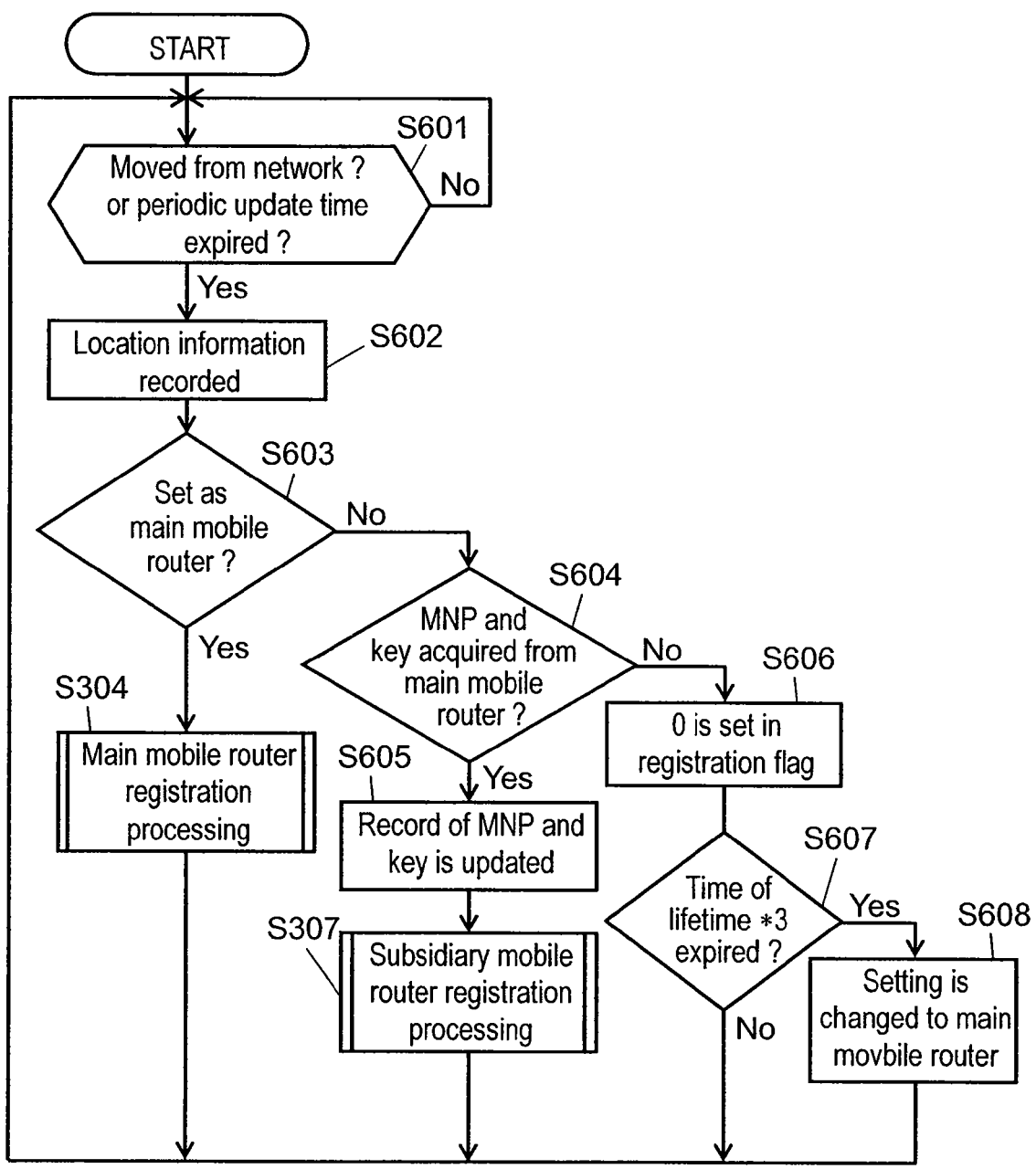
FIG. 6 is a flow chart which shows normal registration processing of the mobile router in the embodiment 1 of the present invention.

FIG. 6 is a flow chart which shows processing of update registration with home agent 6 under normal status.

Firstly, in the case where mobile routers 4, 5 have moved away from the moving network to which they were connected and have moved to a different moving network, or where time for periodic updating of location registration has expired (step S601), location registration processing section 404 updates location information of location information storage section 407 (step S602). That is, location registration processing section 404 acquires a Care of Address from the AR of the connection destination, and updates CoA 2403 of location information storage section 407. In addition, it is necessary that updating is done within the time which is set in lifetime 309 of the location registration request packet.

Next, in the case where status management section 401 checks status storage section 411 (step S603) and judges that this mobile router is the main mobile router, main mobile router registration processing (step S304), which is identical to initial registration processing, is carried out, and thereafter, processing goes back to step S601.

On the other hand, in the case where status management section 401 judges that this mobile router is a subsidiary mobile router, shared MNP management section 409 judges whether it has acquired an MNP and key from the main mobile router or not (step S604). If it has acquired an MNP and key, and in the case where an MNP has been already registered in MNP/key storage section 408, shared MNP management section 409 compares the two keys. In the case where the acquired key is different from the registered key, or in the case where an MNP is not registered, shared MNP management section 409 updates the key, and requests location registration processing section 404 to do location registration processing (step S605). In response to this, location registration processing section 404 carries out subsidiary mobile router registration processing (step S307) which is identical to initial registration processing, and thereafter, processing goes back to step S601.

On the other hand, in the case where an MNP and key have not been acquired from a main mobile router, shared MNP management section 409 sets registration flag 2603 of MNP/key storage section 408 to be 0 (step S606).

Next, in the case where shared MNP management section 409 does not receive a router advertisement packet from a main mobile router even after three times the regular lifetime 315 has passed (step S607), shared MNP management section 409 notifies status management section 410 that the predetermined time has expired. In response to this, status management section 410 sets "0" in status storage section 411 in order to become a main mobile router, and goes back to step S601 (step S608). On the one hand, in the case where this time has not passed, it goes back to step S601 without making a change.

In this manner, according to the present invention, a subsidiary mobile router shares an MNP distributed from a main mobile router, and can relay data of network 2. In addition, in the case where becomes impossible for the subsidiary mobile router to acquire a key from the main mobile router, a location registration request to home agent 6 is unsuccessful, and therefore location registration in home agent 6 is deleted because lifetime expires. In consequence, it becomes impossible for the subsidiary mobile router to relay data of network 2.

Next, a configuration and an operation of home agent 6 in the embodiment 1 of the present invention will be explained.

Figure 7:
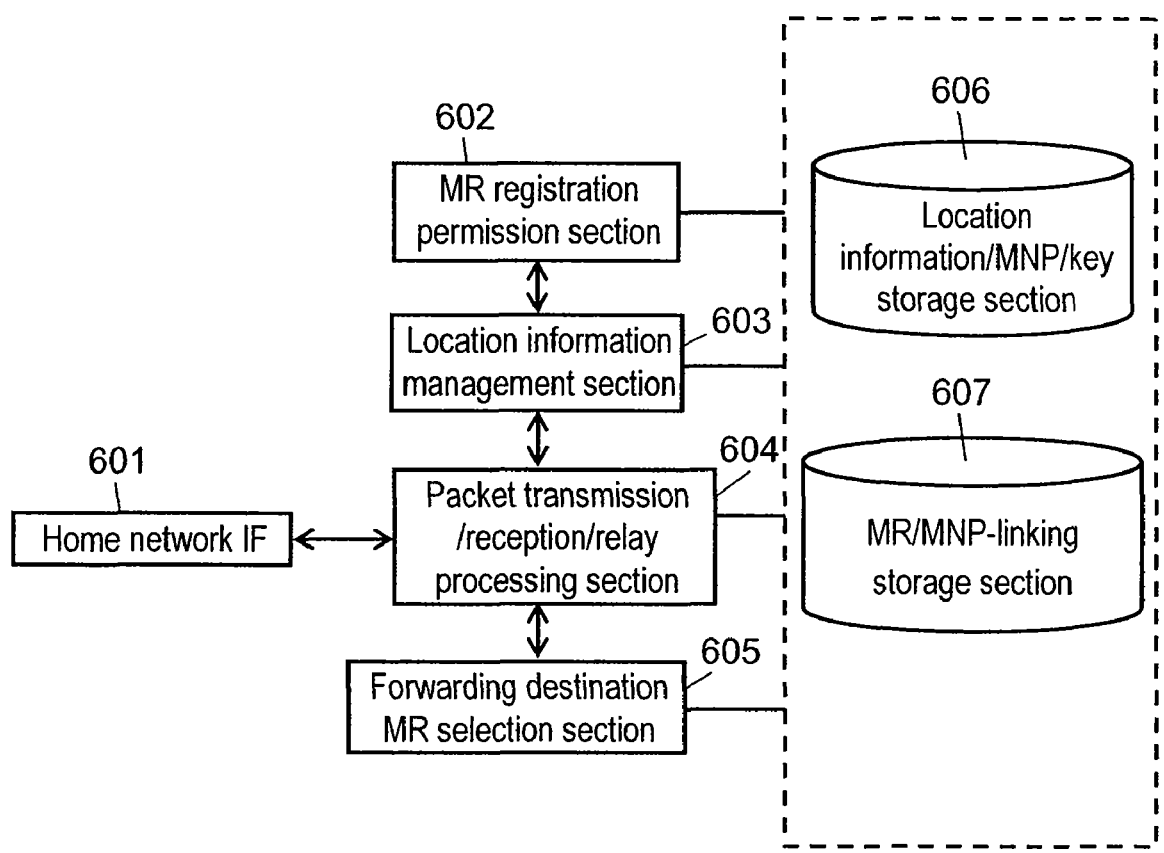
FIG. 7 is a block diagram of a home agent in embodiments 1 and 3 of the present invention.

FIG. 7 is a view which shows a configuration of home agent 6 in the embodiment 1 of the present invention.

In FIG. 7, home network interface 601 is connected to a home network to carry out physical layer processing and data link layer processing, and MR registration permission section 602 is configured to judge whether to allow a location registration request from mobile routers 4, 5 or not. This MR registration permission section 602 corresponds to a registration permission section of the present invention.

Location information management section 603 manages locations of mobile routers 4, 5 in a moving network, and corresponds to a registration information receiving section of the present invention.

Packet transmission/reception/relay processing section 604 is configured to carry out packet transmission/reception/relay processing of packets to a moving network 2, and forwarding destination MR selection section 605 selects a mobile router to be the forwarding destination, when data addressed to a moving network is to be transferred. This forwarding destination MR selection section 605 corresponds to a forwarding destination selection section of the present invention.

Location information/MNP/key storage section 606 stores location information, MNP, and key of each mobile router.

FIG. 24A shows information to be stored in this location information/MNP/key storage section 606.

In FIG. 24A, HoA 2801 is the home address of a registered mobile router, CoA 2802 is the care of address of moving network 2 in which that mobile router is currently located, MNP 2803 is the MNP of that mobile router, and key 2804 is a key used at the time of registering that mobile router, and lifetime 2805 is the remaining lifetime for registration of that mobile router, and D flag 2806 indicates whether this mobile router is the main mobile router (flag "0") or a subsidiary mobile router (flag "1"). This location information/MNP/key storage section 606 corresponds to a registration information storage section of the present invention.

MR/MNP-linking storage section 607 is configured to store a link of HoA and MNP of a main mobile router. This MR/MNP-linking storage section 607 can be used for fixing the address of a device which is used by the owner of a mobile router, by linking a specific mobile router and MNP. By this means, a mobile router which has been registered in MR/MNP-linking storage section 607 does not need to include an MNP in a location registration request packet which it transmits.

An example of information to be stored in MR/MNP-linking storage section 607 is shown in FIG. 25. In this example, HoA (MR4), which is the HoA of mobile router 4, is registered in home address field (HoA) 2701, and MNP1, which is the MNP of mobile router 4, is registered in MNP field 2702. In this case, it is possible to register a location of mobile router 4 in home agent 6, by use of MNP1, even if MNP1 is not included in a location registration request packet. Concretely speaking, a location registration request packet (Binding Update) of FIG. 26 from which mobile network prefix option 307 was excluded is transmitted to home agent 6. In the case where there is no need to link a specific mobile router and MNP, it is all right if MR/MNP-linking storage section 607 is not disposed in home agent 6.

Next, location registration processing of a mobile router which is carried out by home agent 6 will be explained using charts.

Figure 8:
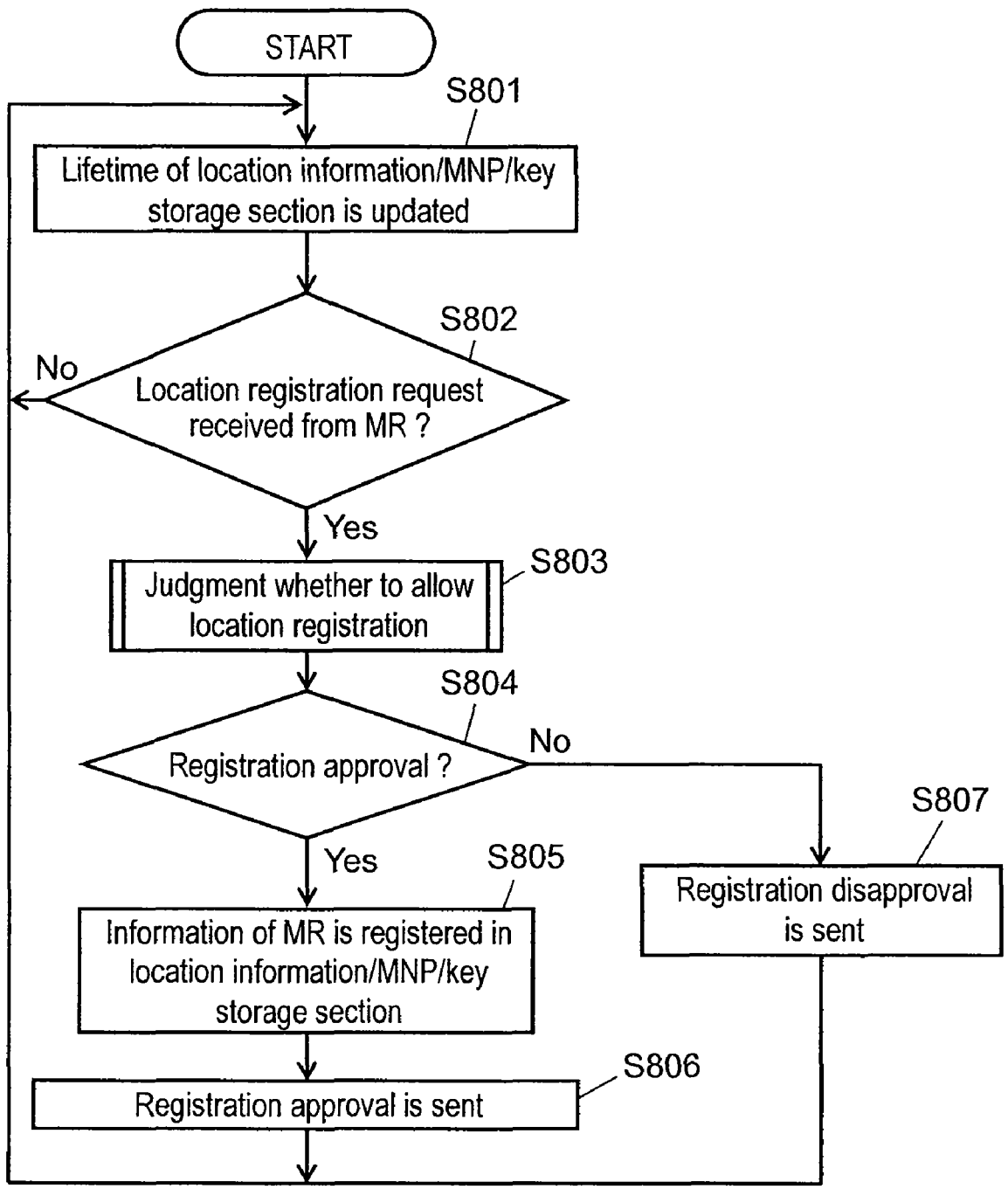
FIG. 8 is a flow chart which shows registration processing of the home agent in the embodiments 1 and 3 of the present invention.

FIG. 8 is a flow chart which shows location registration processing of a mobile router in location information management section 603.

In FIG. 8, firstly, location information management section 603 updates the lifetime of each entry of location information/MNP/key storage section 606, and deletes entries whose lifetime 2805 has become 0 (step S801). In addition, when location information management section 603 deletes a main mobile router (D=0), it also deletes entries of all subsidiary mobile routers registered with the same MNP.

Next, when packet transmission/reception/relay processing section 604 receives a location registration request from a mobile router through home network IF 601 (step S802), it notifies location information management section 603. Location information management section 603 asks MR registration permission section 602 whether to allow location registration of the mobile router which is the request source. MR registration permission section 602 then carries out judgment whether to allow location registration (step S803).

Figure 9:
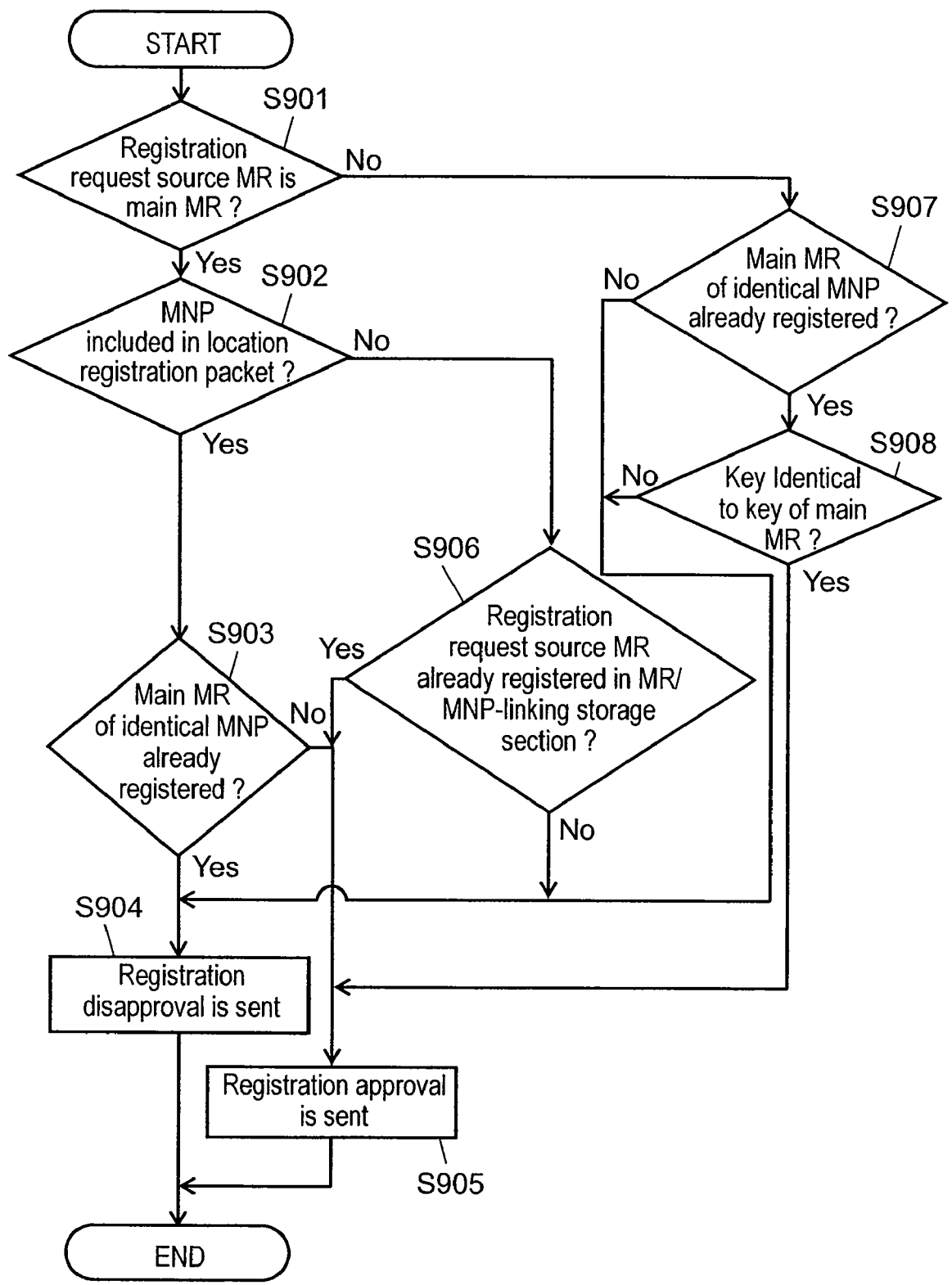
FIG. 9 is a flow chart which shows registration permission judgment processing of the home agent in the embodiment 1 of the present invention.

FIG. 9 is a flow chart which shows registration permission judgment processing for a mobile router in MR registration permission section 602.

In FIG. 9, MR registration permission section 602 refers to D flag 304 of the location registration request packet (step S901), and if D flag 304 is "0" (which means this is the main mobile router), it checks whether mobile network prefix option 307 is included or not (step S902). In the case where mobile network prefix option 307 is included in the location registration request packet, MR registration permission section 602 checks whether or not a main mobile router having the same MNP is registered in location information/MNP/key storage section 606 or MR/MNP-linking storage section 607 (step S903). In the case where the main mobile router having identical MNP has been already registered, MR registration permission section 602 sends registration disapproval to location information management section 603 (step S904).

On the one hand, MR registration permission section 602, in the case where the main mobile router having the same MNP is not registered, returns registration approval to location information management section 603 (step S905).

In step S902, in the case where mobile network prefix option 307 is not included in the location registration request packet, MR registration permission section 602 investigates MR/MNP-linking storage section 607, and checks whether the mobile router which is the registration request source has been already registered or not (step S906). In the case where it has already been registered, processing moves to step S904, and in the case where it is not registered, it moves to step S905. This processing prevents the same MNP of the main mobile router from being registered more than once.

In addition, in step S901, MR registration permission section 602, if D flag 304 is "1" (which means a subsidiary mobile router), checks whether a main mobile router having the same MNP has been already registered in location information/MNP/key storage section 606 or not (step S907), and if it has not yet been registered, processing goes to step S904.

On the other hand, in the case where a main mobile router having the identical MNP has been already registered, MR registration permission section 602 checks whether the key which is included in a location registration request packet, is identical to the registered key of the main mobile router or not (step S908). If the keys are identical, processing goes to step S905, and if they are different, MR registration permission section 602 judges that the mobile router which is the registration request source is not a proper subsidiary mobile router, and processing goes to step S904.

If registration is possible after location information management section 603 receives from MR registration permission section 602 a judgment of registration permission as described above (step S804), MR registration permission section 602 stores information of the request source mobile router in location information/MNP/key storage section 606, and sets lifetime in lifetime field 2805 (step S806).

Here, lifetime, which is included in a location registration request packet, is normally used as the lifetime which is set in lifetime field 803. However, especially in the case where the lifetime which is included in a location registration request packet from a subsidiary mobile router is too large, the entry of a subsidiary mobile router remains for a long period of time even if a main mobile router updates the key which corresponds to the MNP. In order to prevent this, it is desirable to set a maximum value for lifetime of location registration information of a subsidiary mobile router.

Next, location information management section 603 gives registration approval to the mobile router which is the registration request source (step S806). After that, processing goes back to step S801.

In addition, in step S804, in the case where registration has become impossible, location information management section 603 gives registration disapproval to the mobile router which is the registration request source (step S807), and thereafter, processing goes back to step S801. Here, in case of registration disapproval and when there has been already an entry in location information/MNP/key storage section 606, it is desirable for location information management section 603 to delete the entry. However, it is desirable that location information management section 603 does not carry out this deletion of the entry promptly and deletes the entry when registration became impossible a predetermined number of times. This for the following reason. When location information management section 603 deletes an entry quickly in case of registration disapproval, the entry of a subsidiary mobile router may be deleted temporarily, depending on timing of updating the key of the main mobile router and location registration processing of a subsidiary mobile router. On the other hand, in the case where location information management section 603 leaves the entry as it is even if registration disapproval occurs a number of times, an evil-minded person can figure out the key by changing a key randomly.

In this way, location registration of a mobile router in home agent 6 is carried out.

Home agent 6 encapsulates a packet making a terminal which has its MNP registered in location information/MNP/key storage section 606 the transmission source, or the destination. Home agent 6 relays the encapsulated packet using a virtual tunnel built up between it and a mobile router whose location is registered.

Concretely speaking, forwarding destination MR selection section 605 of home agent 6 selects a forwarding destination mobile router from among the main mobile router and subsidiary mobile routers whose destination MNP is registered, and packet transmission/reception/relay processing section 604 relays a packet.

On the occasion that forwarding destination MR selection section 605 selects a mobile router, it is all right if a round robin method, a method based on cost and communication quality, an independently developed method for assigning priority to mobile routers, or other any selection method is used.

In addition, in the above-described processing, in the case where home agent 6 receives a location registration request packet (D=0) which does not include key option 308, home agent 6 gives main mobile router registration permission, and does not permit sharing of MNP by a subsidiary mobile router. This is because, even if a subsidiary mobile router includes any key in a location registration request packet (D=1), it does not coincide with the key of the main mobile router (a key itself does not exist).

In addition, such case corresponds to receiving a location registration request packet from a mobile router which does not utilize the present invention, but is a mobile router which utilizes conventional technology. In this manner, the present invention can also support registration processing by a mobile router utilizing conventional technology.

Next, the registration of location of a mobile router with a home agent in a moving network system including a mobile router and a home agent of the present invention will be explained.

Figure 10:
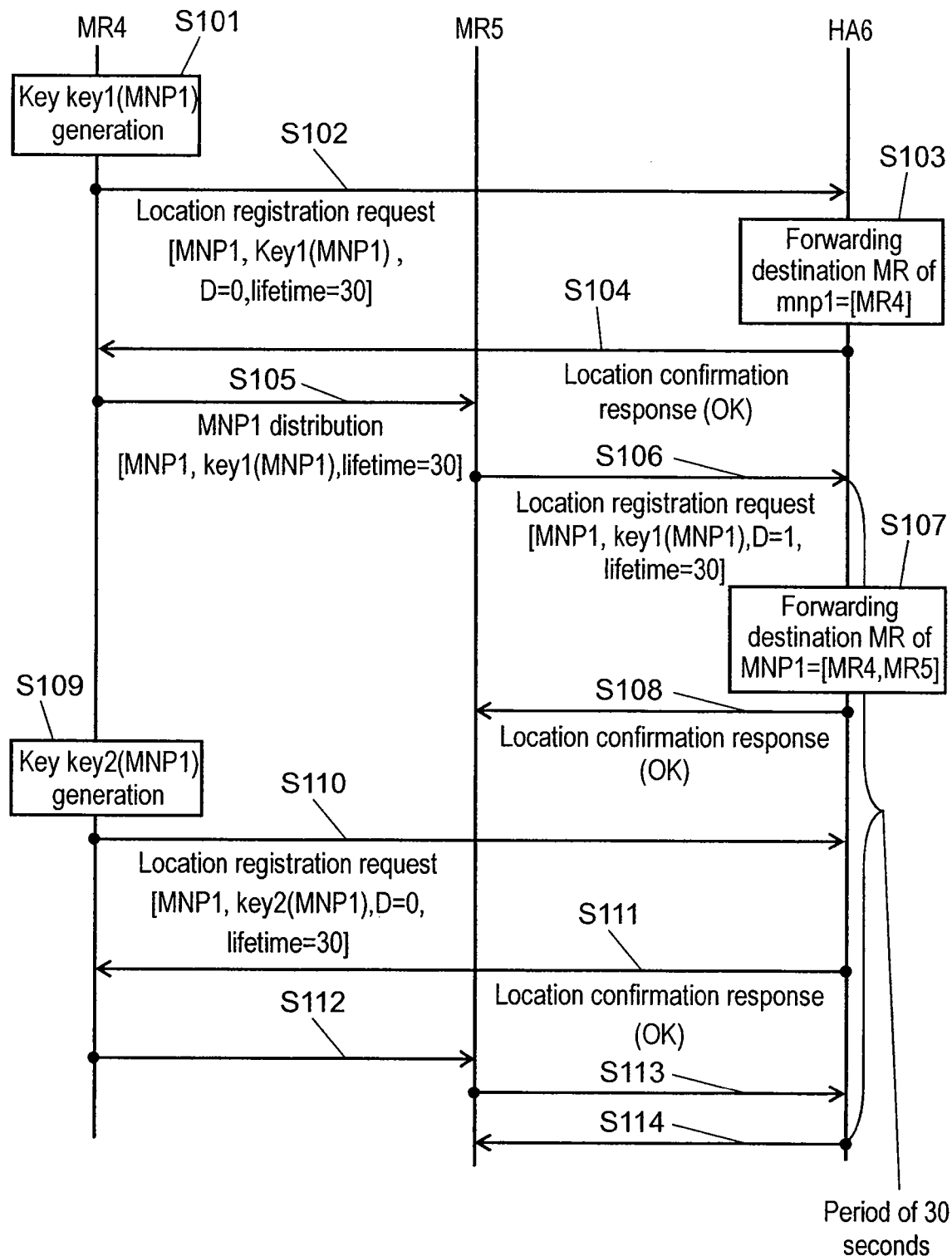
FIG. 10 is a view which shows shared sequence of a network address in the embodiment 1 of the present invention.

FIG. 10 is a sequence chart which shows the operation in which each mobile router registers its location to the home agent 6, with mobile router 4 initially set to be the main mobile router and mobile router 5 initially set up to be a subsidiary mobile router.

Here, it is assumed that mobile router 4 has acquired MNP1 by some method.

Firstly, mobile router 4, which is the main mobile router, generates key Key1 (MNP1) which is a random number that corresponds to MNP1 (step S101).

Next, it transmits a location registration request packet including MNP1, Key1 (MNP1), a flag (D=0) showing that it is the main mobile router, and lifetime (lifetime=30 seconds) for the registration of this information, to home agent 6 (S102).

When home agent 6 receives this location registration request packet, it registers mobile router 4 as a forwarding destination of MNP1, since there exists no other main mobile router in which MNP1 has been registered up to now (step S103). Home agent 6 transmits a location confirmation response (registration approval) packet (step S104).

Next, when mobile router 4 receives this location confirmation response (registration approval) packet, mobile router 4 distributes MNP1, Key1 (MNP1) and lifetime (=30) to another router (here, mobile router 5) in moving network 2 (step S105).

Next, mobile router 5 is operated as a subsidiary mobile router since it has not yet acquired an MNP. Mobile router 5 acquires MNP1, Key1 (MNP1) from mobile router 4, and transmits a location registration request including registration information such as lifetime (lifetime=30), to home agent 6 (step S106).

Next, home agent 6 transmits the location confirmation response (registration approval) packet to mobile router 5 which is the transmission source, since the MNP which is included in the location registration request packet received from mobile router 5 is the same MNP1 already registered by mobile router 4, and the corresponding key is the same Key1 (MNP1) (step S108). Home agent 6 also registers mobile router 5 as a forwarding destination of MNP1. By this means, two mobile routers 4, 5 become forwarding destinations of MNP1 (step S107). Data in location information/MNP/key storage section 606 of home agent 6 at this time becomes as shown in FIG. 24A.

Next, after a predetermined time period has passed since location registration, mobile router 4 generates a new key Key2 (MNP1) which corresponds to MNP1 (step S109).

Next, mobile router 4 transmits a location registration request packet including the new key Key2 (MNP1) again to home agent 6, and carries out updating of location registration (step S10).

When home agent 6 receives this location registration request packet, it judges that it has come from the main mobile router 4 whose MNP1 has been already registered, and updates registration of mobile router 4 as a forwarding destination of MNP1. Home agent 6 transmits a location confirmation response (registration approval) packet to mobile router 4 (step S111).

Next, when mobile router 4 receives this location confirmation response (registration approval) packet, it distributes MNP1, Key2 (MNP1) and lifetime (=30) to another mobile router (here, mobile router 5) in moving network 2 (step S112).

Next, mobile router 5 acquires MNP1 and Key2 (MNP1) from mobile router 4, and transmits a location registration request packet including registration information such as lifetime (lifetime=30) again to home agent 6 (step S113).

Next, when home agent 6 receives the location registration request packet from mobile router 5, home agent 6 transmits a location confirmation response (registration approval) to mobile router 5, since the MNP which was included in the location registration request packet is the same as the MNP1 already registered by mobile router 4 and the corresponding key is the same as Key2 (MNP1) (step S114). Home agent 6 also updates registration of mobile router 5 as a forwarding destination of MNP1. Data at this time in location information/MNP/key storage section 606 of home agent 6 becomes as shown in FIG. 24B.

Next, the operation at the time that mobile router 5 breaks away from moving network 2 will be explained.

Figure 11:
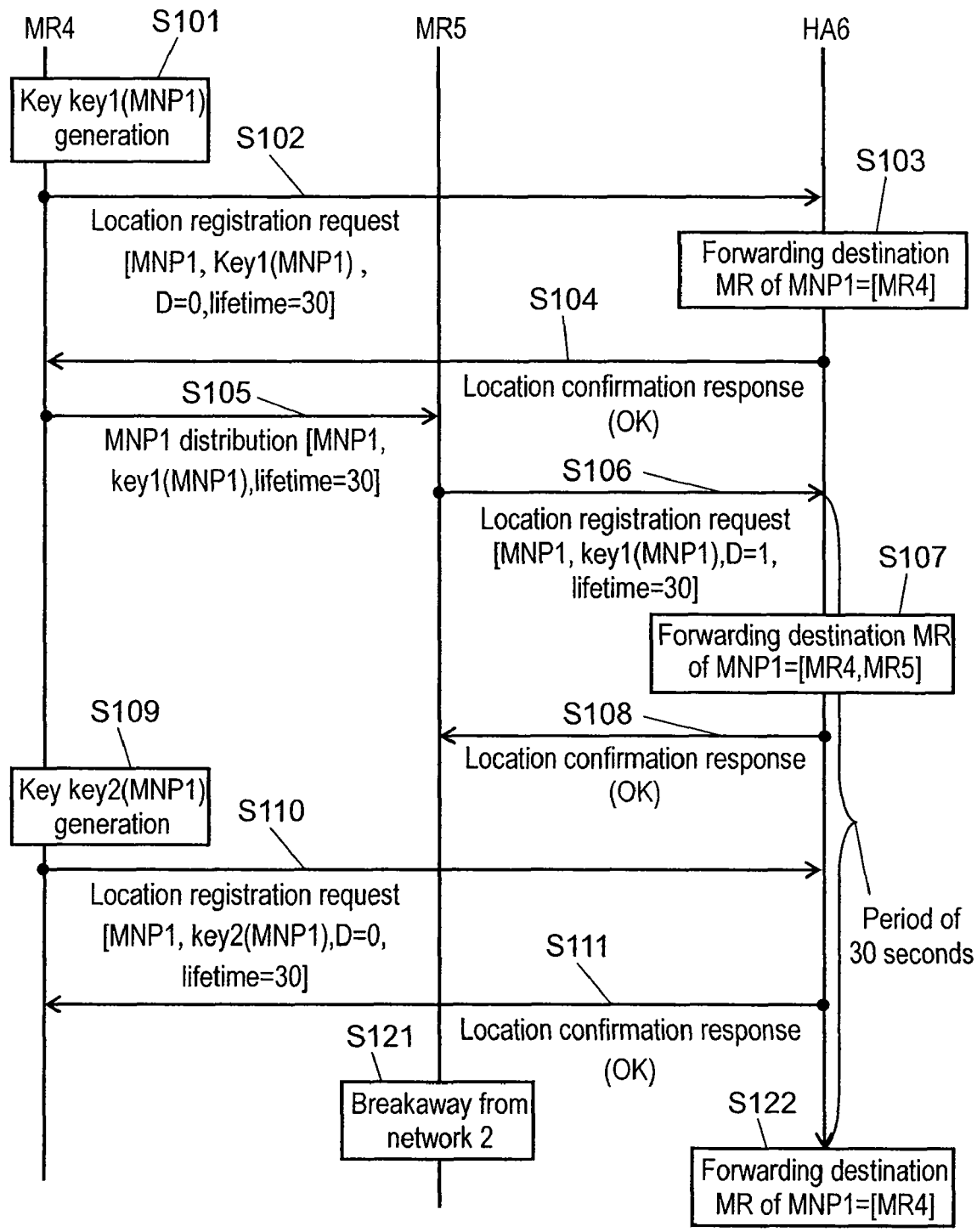
FIG. 11 is a view which shows shared sequence of the network address (in the case where the subsidiary mobile router has broken away) in the embodiment 1 of the present invention.

FIG. 11 is a sequence chart which shows an operation at this time.

Operations of step S101 through step S111 are identical to those in FIG. 10. At this time, after mobile router 5 breaks away from moving network 2 (step S121), mobile router 4 can not distribute Key2 (MNP1) to mobile router 5. In addition, even if mobile router 5 transmits a location registration request to home agent 6 for the purpose of updating of location registration, home agent 6 judges that registration is impossible and updating of registration is not successful, since a key included remains to be Key1 (MNP1).

After that, location information of mobile router 5 is deleted since the effective period (after 30 seconds of lifetime from step S106) has expired, and the only forwarding destination of MNP1 is mobile router 4 (step S122).

In this manner, mobile routers 4, 5 repeat registration to home agent 6 within their lifetime on a steady basis. If mobile router 5 breaks away from network 2, mobile router 5 can not receive key Key2 (MNP1) which was newly generated by mobile router 4, and therefore, it becomes impossible for mobile router 5 to share MNP1. By this means, it is possible to prevent a person who acquired a subsidiary mobile router from tapping a packet on a moving network specified by MNP1, by use of that subsidiary mobile router. In this regard, however, it becomes easily possible for a mobile router which is located in the same area, to learn the key which is distributed from mobile router 4. On this account, it is more preferable to introduce security of a link layer separately, so that the only mobile router and terminal which can exchange data in moving network 2 are those permitted by a user.

Figure 12:
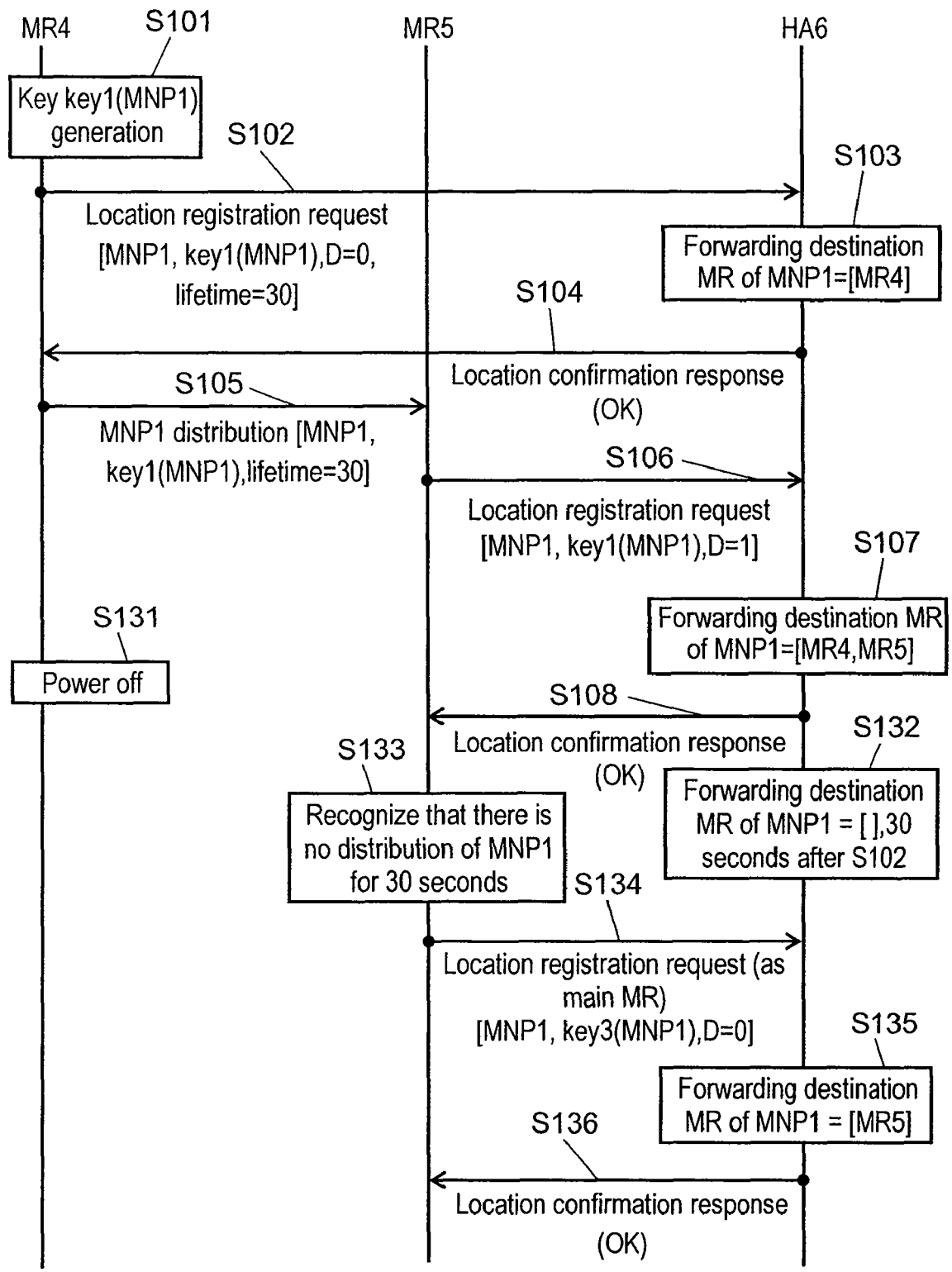
FIG. 12 is a view which shows shared sequence of the network address (in the case where power of the main mobile router is turned OFF during operation) in the embodiment 1 of the present invention.
Figure 13:
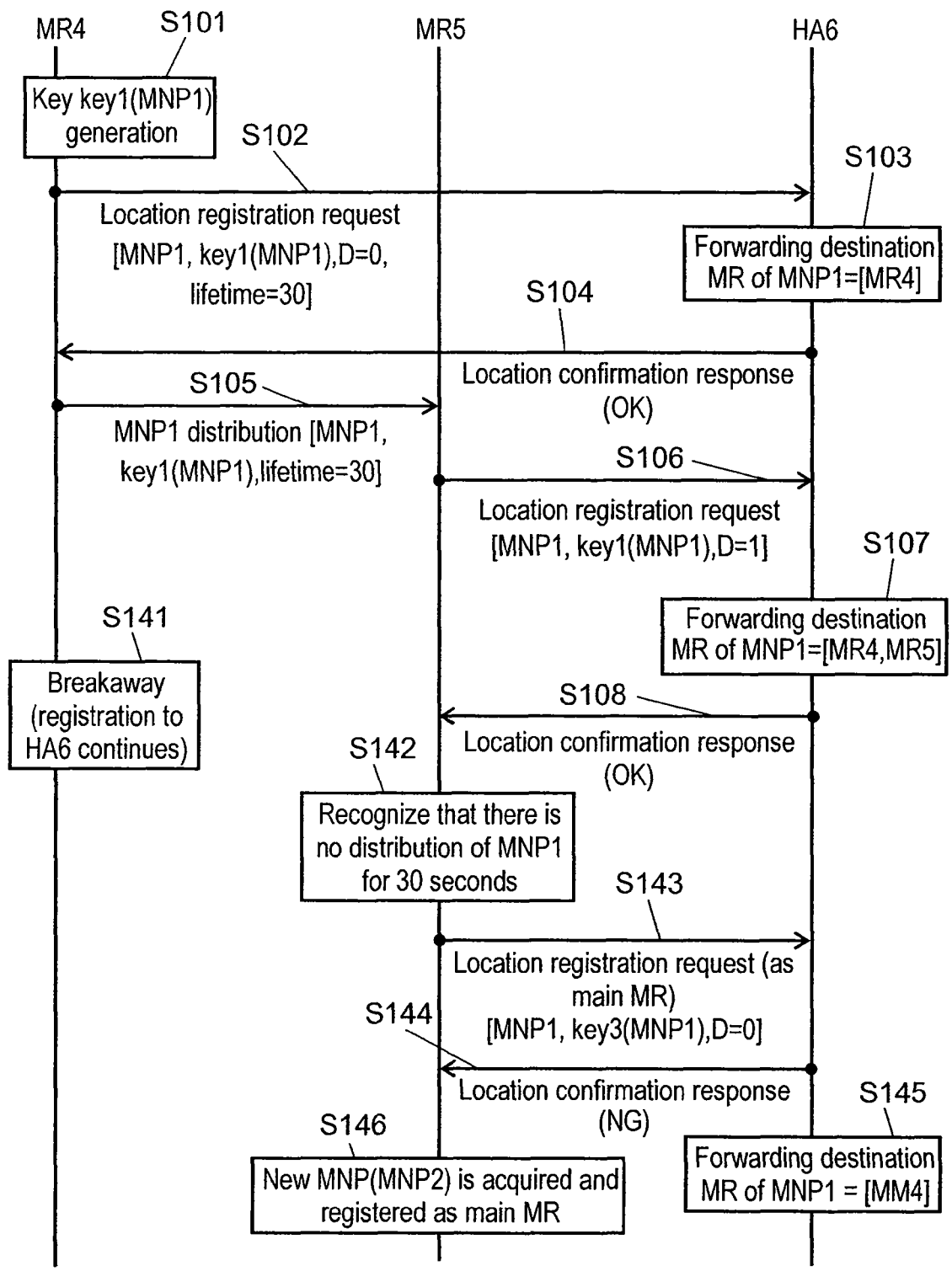
FIG. 13 is a view which shows shared sequence of the network address (in the case where the main mobile router breaks away from the subsidiary mobile router while continuing operation) in the embodiment 1 of the present invention.

FIGS. 12 and 13 are sequence charts which show an operation when mobile router (MR) 5, which is a subsidiary mobile router, recognizes that MNP distribution from mobile router (MR) 4 which is a main mobile router has stopped and then starts operation as the main mobile router. FIG. 12 shows a case where power of mobile router 4 was turned OFF, and FIG. 13 shows such a case where mobile router 4 has moved to a place removed from mobile router 5 (same as the case of FIG. 6).

In FIG. 12, step S101 through step S108 are identical to those in FIG. 10. At this time, when power of mobile router 4 is turned OFF (or, a battery is exhausted) (step S131), distribution of MNP and key from mobile router 4 which is a main mobile router stops.

In addition, in home agent 6, the registration content of mobile router 4 is deleted after 30 seconds have passed since registration of mobile router 4 (step S102), because the lifetime period has expired (step S132).

Next, mobile router 5 has stored that the effective period of MNP1 distributed from mobile router 4 is 30 seconds, and when it recognizes that there has been no distribution of MNP1 for 30 seconds, it switches over to an operation mode in which itself operates as a main mobile router. Mobile router 5 generates a new key Key3 (MNP1) (step S133).

Next, mobile router 5 transmits a location registration request packet including key Key3 (MNP1) to home agent 6 (step S134). Mobile router 5 continues to use MNP1 as the MNP to be given in the location registration request packet at this time.

Next, home agent 6 registers mobile router 5 as a forwarding destination of MNP1, since there is no main mobile router which has been registered with MNP1 at the time it receives the location registration request packet from mobile router 5 (step S135). Home agent 6 transmits a registration response (registration approval) packet to mobile router 5 (step S136).

In this way, when a main mobile router stops its function of location registration, a subsidiary mobile router registers itself as a main mobile router in home agent 6. By this means, it becomes possible for a terminal in a moving network to continuously carry out transmission of a packet to an external network, and reception of a packet addressed to itself.

Next, the operation in the case where mobile router 4 only disconnects from mobile router 5 and continues to carry out registration to home agent 6 will be explained using FIG. 13.

In FIG. 13, step S101 through step S108 are identical to those in FIG. 10. At this time, when mobile router 4 breaks away from mobile router 5 and communication becomes impossible (step S141), mobile router 5 recognizes that distribution of MNP1 has stopped for 30 seconds. Mobile router 5 switches over to an operation mode in which mobile router 5 operates as the main mobile router, and generates new key Key3 (MNP1) (step S142).

Next, mobile router 5 transmits a registration request packet, as the new main mobile router of MNP1 (step S143).

Next, home agent 6 rejects this registration request and transmits a location confirmation response (registration disapproval) packet to mobile router 5, since mobile router 4 is registered as the main mobile router of MNP1 (step S144).

After that, mobile router 5 cannot acquire a key which is distributed from mobile router 4, and therefore, cannot carry out updating registration as a subsidiary mobile router, and in such a state, 30 seconds, which is the lifetime, passes. In consequence, mobile router 4 becomes the only forwarding destination mobile router of MNP1 (step S145).

After that, if mobile router 5 can acquire a new MNP (e.g., MNP2), it becomes possible to register it as the main mobile router of MNP2 (step S146).

In this way, according to the present invention, on the occasion that a plurality of mobile routers configure one moving network and share an MNP which is the network identifier of the moving network, MNP is shared continuously even after a mobile router becomes disconnected to the moving network, and thereby, it is possible to prevent a packet from being kept in one moving network. This is useful for achieving a moving network which has robustness, switching mobile routers when problems such as device failure and poor connectivity of mobile routers occur, and for load sharing between mobile routers.

In addition, even if location registration processing from a mobile router to a home agent occurs frequently because moving speed of each mobile router is fast and the number of mobile routers for one home agent is large, it is possible to prevent a load of a home agent from increasing since the mobile router generates the key.

Embodiment 2

This embodiment 2 is identical to the embodiment 1, except that the device which generates a key is not the mobile router but the home agent.

Here, with regard to configurations and operations of the mobile router and home agent, only points which are different from those in the embodiment 1, will be explained.

Figure 15:
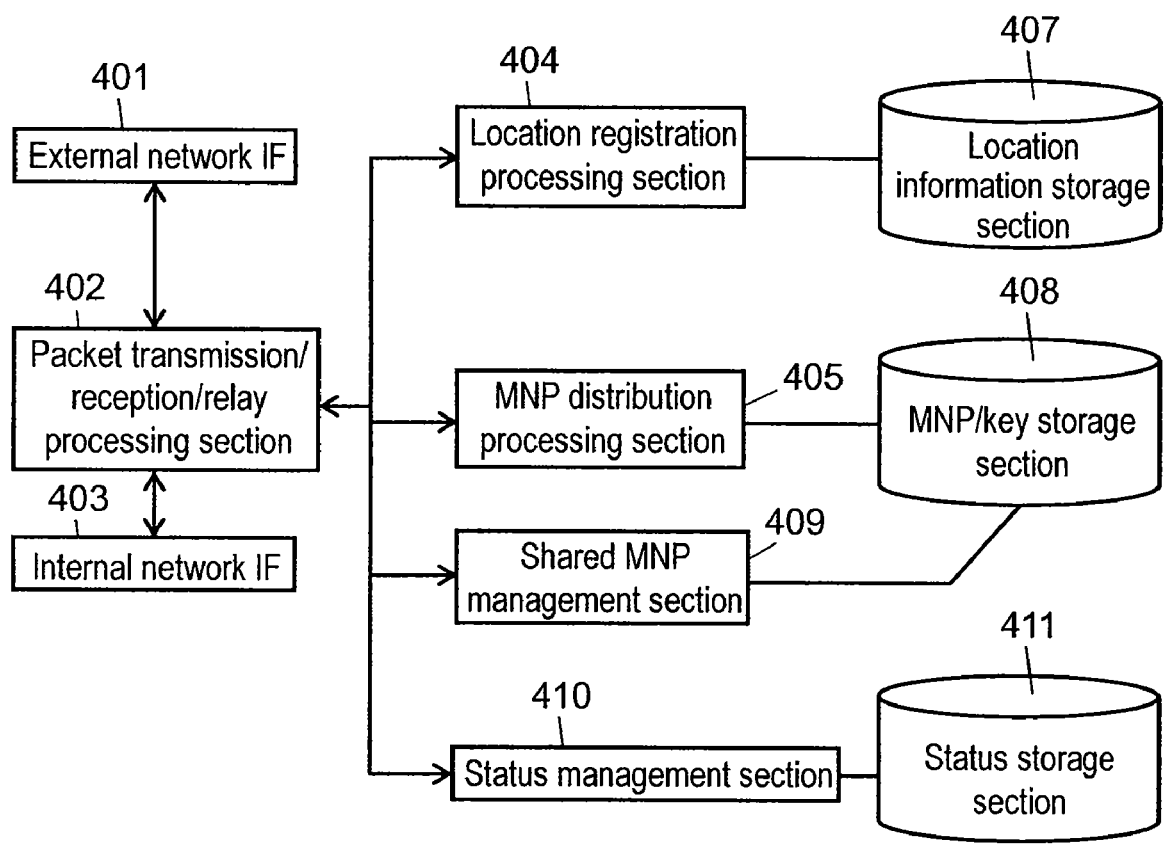
FIG. 15 is a block diagram of a mobile router in an embodiment 2 of the present invention.

FIG. 15 is a view which shows a configuration of a mobile router in the embodiment 2 of the present invention.

A point different from the configuration of a mobile router in the embodiment 1 (FIG. 2) is that there is no key generation processing section (406).

Figure 16:
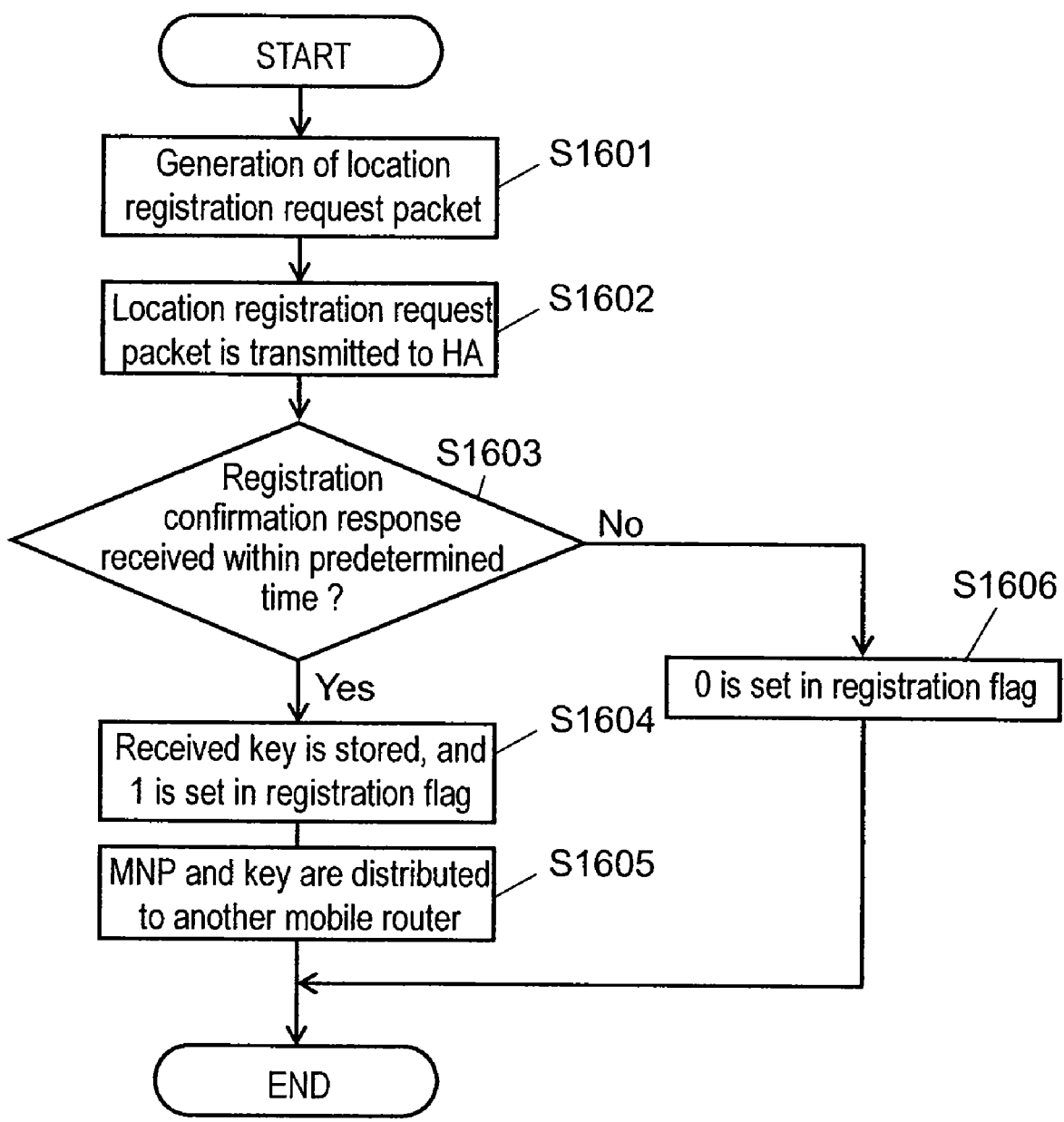
FIG. 16 is a flow chart which shows initial registration processing of the mobile router in the embodiment 2 of the present invention.

In addition, the operation of the mobile router differs from embodiment 1 only in main mobile router registration processing (step S304). Hereinafter, this main mobile router registration processing will be explained using FIG. 16.

Firstly, location registration processing section 404 reads out the MNP from MNP/key storage section 408, and further reads out the address of the home agent and the CoA from location information storage section 407, and generates a location registration request packet using them (step S1601).

Next, location registration processing section 404 sets the lifetime of MNP to an initial value (here, 30), and transmits a location registration request packet (D=0) including MNP and lifetime, from packet transmission/reception/relay processing section 402 through external network IF 401 (step S1602).

Next, packet transmission/reception/relay processing section 402 checks whether or not it has received a registration confirmation response from home agent 6 within a predetermined time period (step S1603). When packet transmission/reception/relay processing section 402 receives a location registration confirmation response (OK) from home agent 6, shared MNP management section 409 stores the key which is included in the confirmation response received from the home agent in MNP/key storage section 408 (step S1604).

Here, a format of a location confirmation response packet is shown in FIG. 27.

In this format, key option 326 is added as an extension option to a binding acknowledgement packet, and a key is set in key field 291. Routing header type 2 (324) and binding acknowledgement 325 are the same as defined in a binding acknowledgement packet.

Concretely speaking, shared MNP management section 409 stores a received key in key 2602 of MNP/key storage section 408, and sets registration flag 2603 to be "1" (step S1604), and thereafter, MNP distribution processing section 405 multicast-transmits a router advertisement packet including MNP, key and lifetime in moving network 2 (step S1605).

On the other hand, in the case where registration to home agent 6 fails, shared MNP management section 409 deletes the MNP which failed to be registered from MNP/key storage section 409, sets the registration flag to "0" (step S1606), and thereafter terminates processing.

The foregoing is the main mobile router registration processing, different from the embodiment 1 in that a mobile router receives a key from home agent 6 in step S1604 and stores that key together with MNP in pairs.

Next, a configuration and an operation of home agent 6 in the embodiment 2 of the present invention will be explained.

Figure 17:
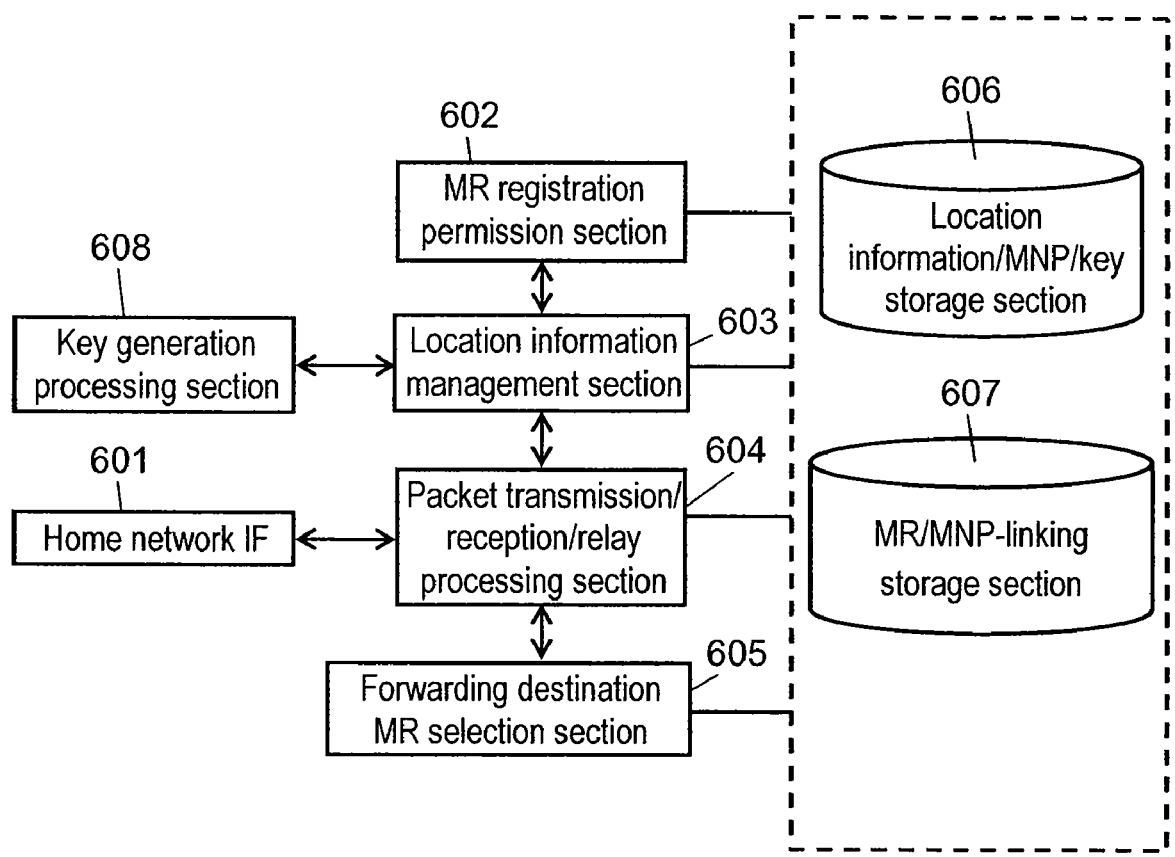
FIG. 17 is a block diagram of a home agent in the embodiment 2 of the present invention.

FIG. 17 is a view which shows a configuration of home agent 6 in the embodiment 2 of the present invention. This embodiment differs from the embodiment 1 shown in FIG. 7 in that it has key generation processing section 608.

Key generation processing section 608 generates a key which corresponds to the MNP held by the main mobile router, and updates it periodically. This key generation processing section 608 corresponds to a key generation section of the present invention.

Figure 18:
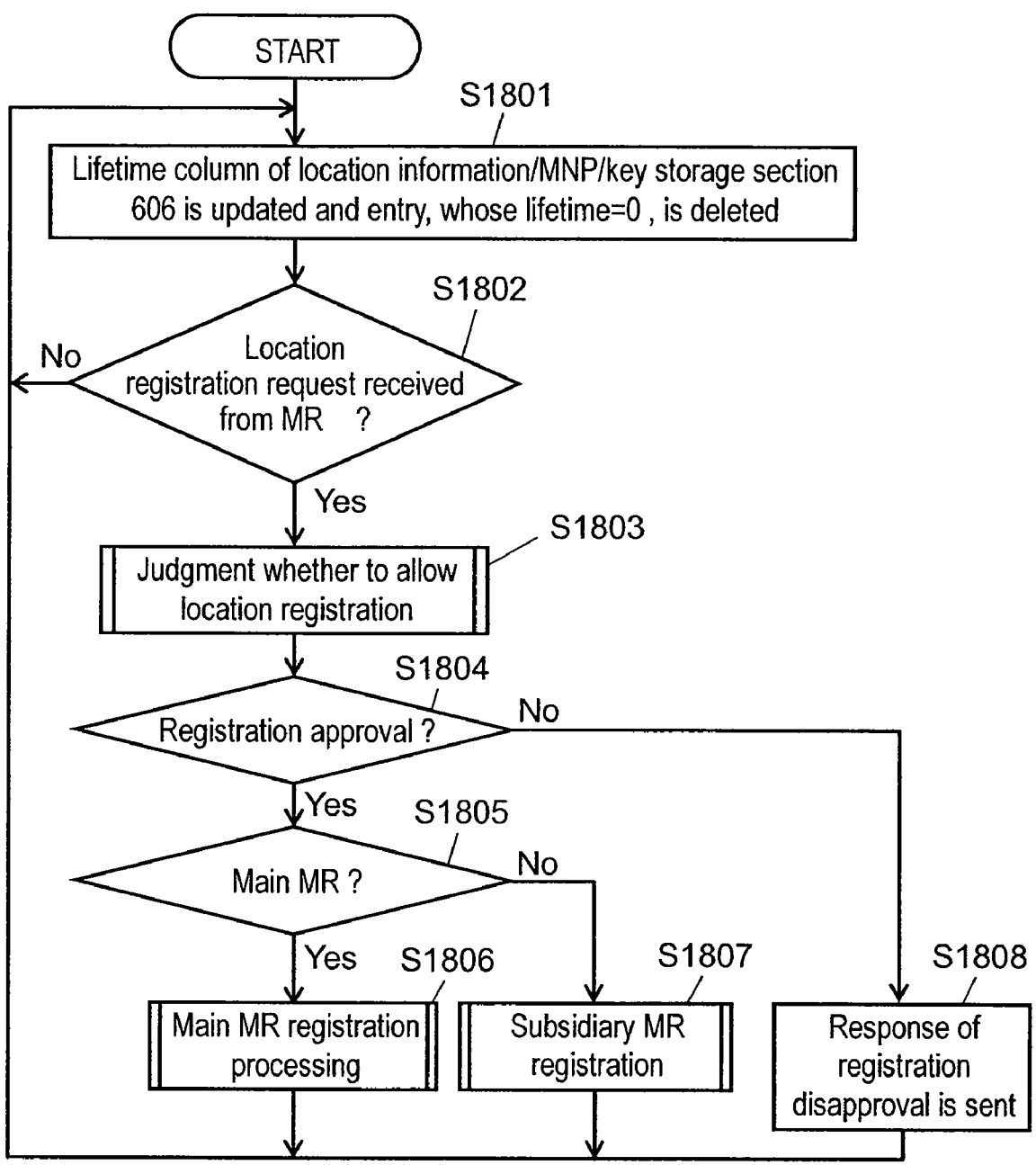
FIG. 18 is a flow chart which shows registration processing of the home agent in the embodiment 2 of the present invention.

FIG. 18 is a flow chart which shows the operation of home agent 6 in the embodiment 2 of the present invention.

Firstly, location information management section 603 updates a lifetime column of location information/MNP/key storage section 606, deleting any entry whose lifetime has become "0" (step S1801). Here, at the time of deleting an entry of a main mobile router, the entry of a subsidiary mobile router registered with the same MNP is deleted simultaneously.

Next, when packet transmission/reception/relay processing section 604 receives a location registration request packet from a mobile router (step S1802), it notifies location information management section 603. Location information management section 603 asks MR registration permission section 602 to judge whether to allow location registration. MR registration permission section 602 carries out judgment of location registration which is identical to that shown in FIG. 9 of the embodiment 1 (step S803).

In the case where the result of the judgment is registration approval (step S1804), location information management section 603 checks whether the mobile router which is the registration request source is the main mobile router or not (step S1805). In the case where it is the main mobile router, location information management section 603 carries out main MR registration processing (step S1806), and in the case where it is a subsidiary mobile router, it carries out sub MR registration processing (step S1807).

On the other hand, in case of registration disapproval, location information management section 603 sends registration disapproval to the mobile router which is the registration request source (step S1808).

Figure 19:
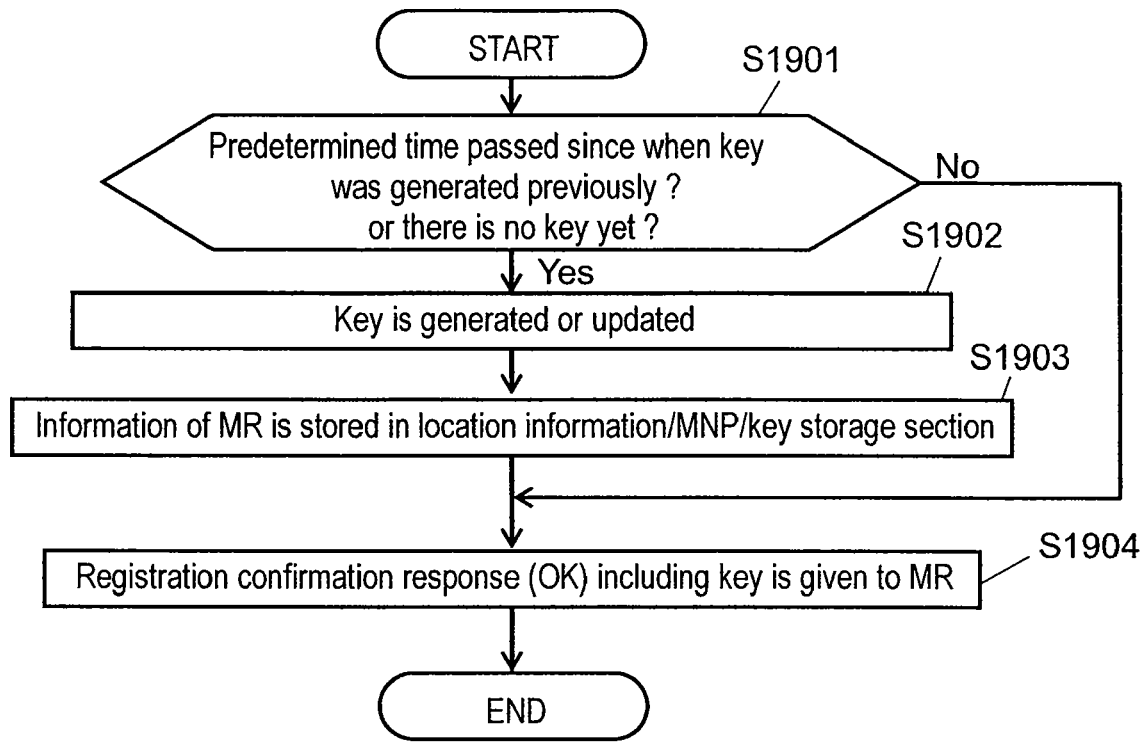
FIG. 19 is a flow chart which shows main MR registration processing of the home agent in the embodiment 2 of the present invention.

FIG. 19 is a flow chart which shows main MR registration processing (step S1806).

Firstly, key generation processing section 608 generates or updates a key (step S1902), in the case where a predetermined time period has passed since a key was generated previously, or where a key has not been generated yet (step S1901). Location information management section 603 stores information of the mobile router in location information/MNP/key storage section 606 (step S1903).

Next, location information management section 603 sends registration approval, including the generated or updated key, to the mobile router through a step such as addition of key option 291 to a binding acknowledgement packet shown in FIG. 27 (step S1904).

Figure 20:
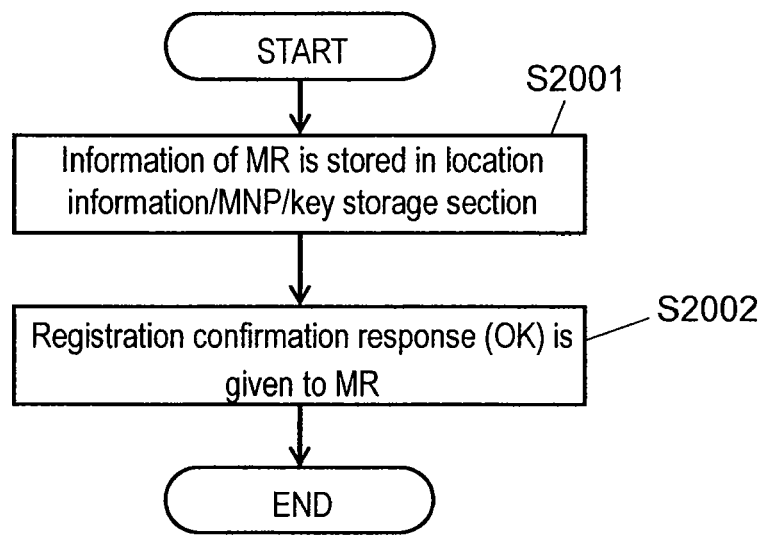
FIG. 20 is a flow chart which shows sub MR registration processing of the home agent in the embodiment 2 of the present invention.

FIG. 20 is a flow chart which shows sub MR registration processing (step S1807). This processing is the same as that in the embodiment 1, location information management section 603 storing information of a subsidiary mobile router in location information/MNP/key storage section 606 (step S2001), and thereafter transmitting registration approval to the subsidiary mobile router (step S2002).

In this manner, the embodiment 2 is different from the embodiment 1 in that home agent 6 transmits a registration response including a key at the time of registering the main mobile router.

Figure 21:
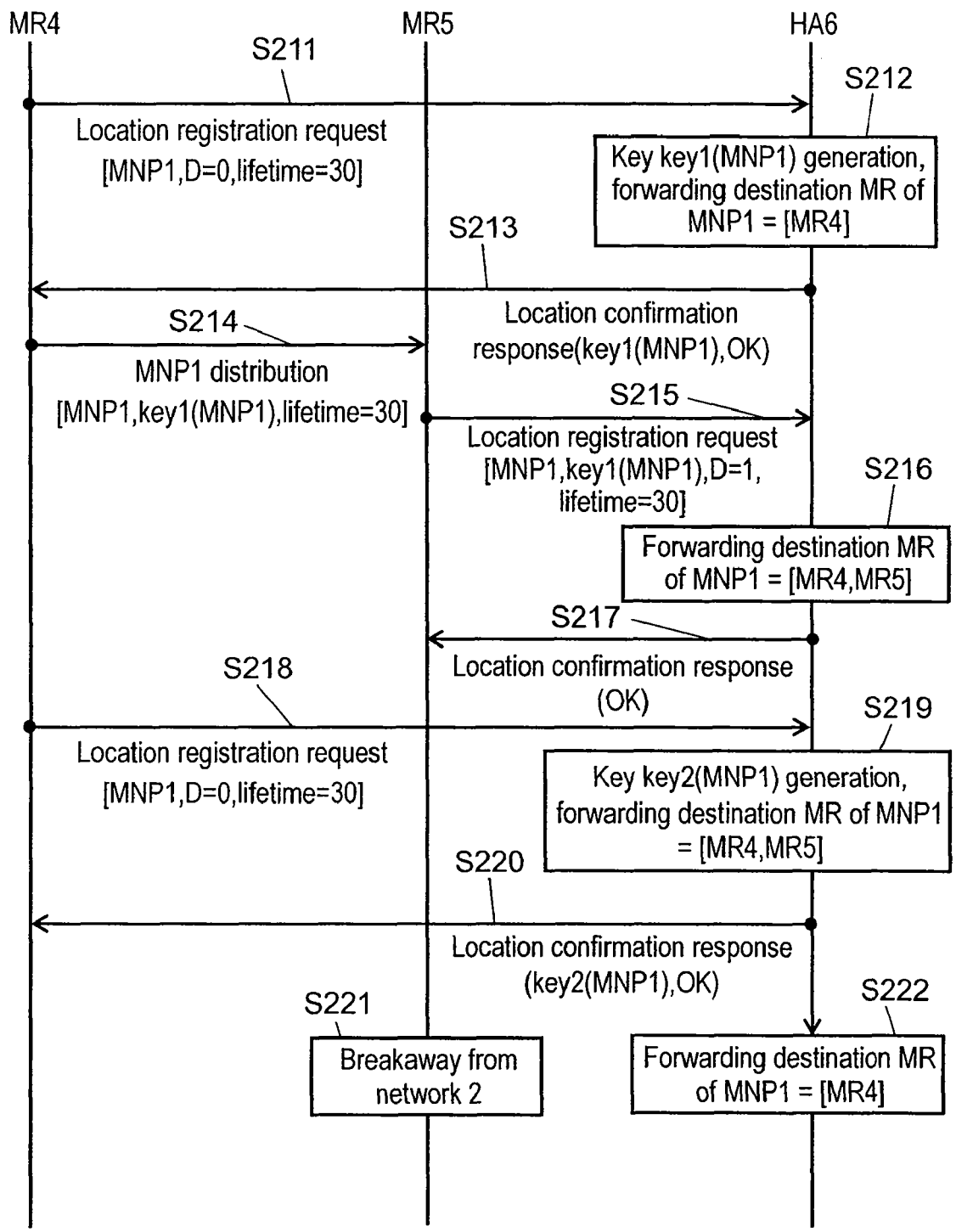
FIG. 21 is a view which shows shared sequence of the network address (in the case where a subsidiary mobile router disconnected) in the embodiment 2 of the present invention.

FIG. 21 is a sequence chart which shows an operation where mobile router 4 is initially set to be the main mobile router and mobile router 5 is initially set to be a subsidiary mobile router, and each mobile router registers a location in home agent 6. It is different from the embodiment 1 in that a key is generated by the home agent and transmitted to the main mobile router. Here, it is assumed that MNP1 is acquired by mobile router 4 by some means.

In FIG. 21, firstly, mobile router 4 which is the main mobile router transmits a location registration request including MNP1 and D flag (=0) and lifetime for registration (lifetime=30 seconds) to home agent 6 (step S211).

Home agent 6 receives this location registration request, and permits registration of mobile router 4 as a forwarding destination of MNP1, since another main mobile router, for which MNP1 has been registered up to now, does not exist. Home agent 6 generates key Key1 (MNP1) which is a random number that corresponds to MNP1, and registers mobile router 4 as a main mobile router of MNP1 linked with key Key1 (MNP1) (step S212). After that, home agent 6 adds key Key1 (MNP1) to a location confirmation response (registration approval) and transmits it (step S213).

Subsequent steps S214 through S217 are identical to steps S105 through S108 in FIG. 10 of the embodiment 1.

Next, mobile router 4 transmits a location registration request to home agent 6 again, after predetermined time has passed since location registration, and carries out updating of location registration (step S218).

When home agent 6 receives this location registration request, it judges that its source is identical to main mobile router 4 which has been already registered in MNP1. Home agent 6 permits updating of registration of mobile router 4 as a forwarding destination of MNP1. Further, home agent 6 generates new key Key2 (MNP1), and updates its registration, and thereafter adds key Key2 (MNP1) to a location confirmation response (registration approval) and transmits it to mobile router 4 (step S220).

Subsequent operations are identical to steps S112 through S114 in FIG. 10 of the embodiment 1.

In addition, also in this embodiment, when mobile router disconnects from moving network 2 (step S221), it cannot receive Key2 (MNP1), and therefore mobile router 5 transmits a location registration request to home agent 6, still with Key1 (MNP1). Thus, home agent 6 judges that the key is different, and does not give permission to register mobile router 5 as a subsidiary mobile router. After that, location information of mobile router 5 is deleted from the home agent since the effective period (after 30 seconds of lifetime from step S215) has expired, so that only mobile router 4 is a forwarding destination of MNP1 (step S222).

In this manner, mobile routers 4, 5 repeat registration to home agent 6 within their lifetime on a steady basis. On this account, if mobile router 5 breaks away from network 2, it can not receive key Key2 (MNP1) which was newly generated by home agent 6, and therefore, it becomes impossible for mobile router 5 to share MNP1. By this means, it is possible to prevent a person who acquires mobile router 5 from illegally acquiring a packet in the moving network of MNP1 by use of this mobile router.

In addition, in this embodiment 2, the home agent generates the key, and therefore it becomes possible to reduce a load on the mobile router, and reduce cost and size of the mobile router. Therefore, in the case where location registration processing does not occur frequently, this embodiment 2 is desirable since there is no problem even if a load on the home agent increases to some degree.

As above, according to the present invention, after a mobile router becomes disconnected from a moving network where a plurality of mobile routers configure one moving network and share an MNP, it becomes impossible for this mobile router to acquire a packet addressed to the moving network, and therefore, it is possible to prevent erroneous distribution and illegal viewing of a packet.

Embodiment 3

This embodiment is different from the embodiments 1 and 2 in that each mobile router is a main mobile router which has a network identifier unique to itself, and at the same time, operates as a subsidiary mobile router which shares in a network identifier of another mobile router.

In addition, this embodiment is configured so that the mobile router generates the key in the same manner as in the embodiment 1, but it is all right even if it is configured so that the home agent generates the key as in the embodiment 2.

In what follows, points different from the embodiment 1 will be explained.

A configuration of mobile routers 4, 5 in this embodiment is shown in FIG. 29.

This embodiment is different from the configuration in the embodiment 1 (FIG. 2) in that it has no status management section 410 and status storage section 411.

In this embodiment, a mobile router performs the functions of both the main mobile router and a subsidiary mobile router simultaneously, and therefore, management of status is carried out by a D flag which is newly added to MNP/key storage section 2906 in lieu of a status management section and a status storage section.

FIGS. 33A, B are views which show the configuration of information to be stored in MNP/key storage section 2906 in this embodiment.

In FIGS. 33A,B, MNP field 3301, key field 3302 and registration flag field 3303 are the same as those in the embodiment 1.

D flag field 3304 is identical with D flag defined in mobile network prefix option 307 of BU packet, and indicates whether the MNP is managed as the main mobile router or as a subsidiary mobile router. In case of managing the MNP as the main mobile router, 0 is stored, and in case of MNP for managing it as a subsidiary mobile router, 1 is stored.

Location registration processing section 2901 carries out storage of a care of address, and registration of location information and network identifier information to home agent 6 in the same manner as the embodiment 1. This location registration processing section 2901 corresponds to the plural network identifier simultaneous registration section of the present invention in the case where it is the main mobile router and at the same time functions as a subsidiary mobile router of a network identifier of another mobile router network.

MNP distribution processing section 2902 is different from MNP distribution processing section 405 of the embodiment 1 in that the key of an MNP whose D flag is "0" in MNP/key storage section 2906 is distributed to another mobile router in a moving network. In addition, key generation processing section 2903 is different from key generation processing section 406 of embodiment 1 in that it generates a random number key that corresponds to MNP and stores it in MNP/key storage section 2906, setting D flag to 0 at that time. Further, shared MNP management section 2904 is different from shared MNP management section 409 of embodiment 1 in that when shared MNP management section 2904 acquires the MNP and key from another mobile router, it stores them in MNP/key storage section 2906, setting D flag to 1 at that time.

Next, operations of mobile routers 4, 5 in this embodiment will be explained by use of drawings.

Figure 30:
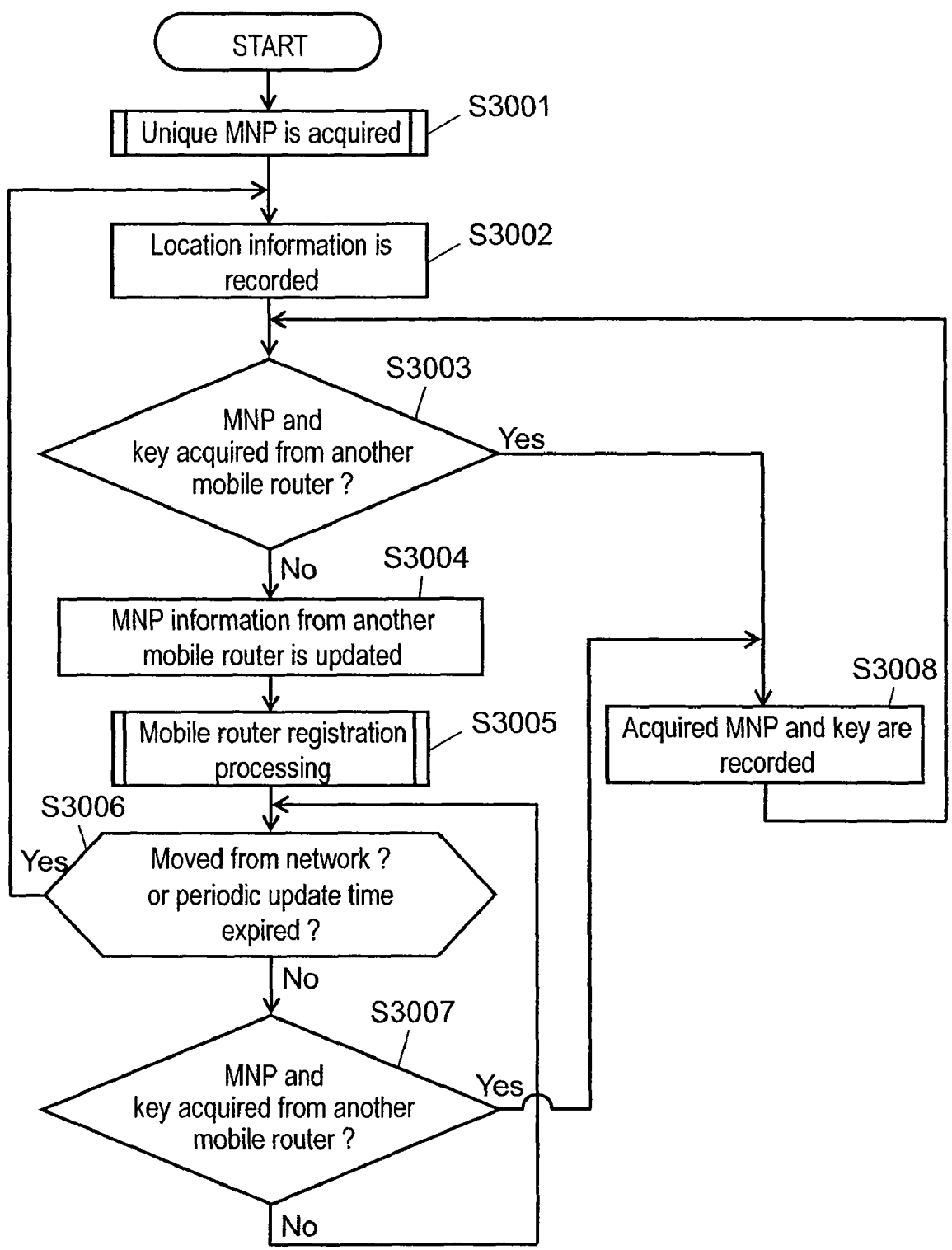
FIG. 30 is a flow chart which shows location registration processing of the mobile router in the embodiment 3 of the present invention.

FIG. 30 is a flow chart which shows location registration processing to home agent 6 in mobile routers 4, 5.

Firstly, a mobile router acquires an MNP which is unique to itself (step S3001). As an acquiring method, DHCP, manual setting and so on are possible, but it is all right if it is set beforehand in MR/MNP-linking storage section 607 of the home agent.

Next, location registration processing section 2901 registers CoA acquired from AR3, in location information storage section 2905 (step S3002).

Location registration processing section 2901 requests shared MNP management section 2904 to check whether it acquired MNP and key from another mobile router. In the case where shared MNP management section 2904 acquired them from another mobile router, shared MNP management section 2904 stores the acquired MNP and key in MNP/key storage section 2906 (step S3008). Processing of steps S3003 and S3008 is carried out as many times as the number of acquired MNP, and shared MNP management section 2904 records all of acquired MNPs and keys in MNP/key storage section 2906. In this regard, however, in the case where there is only an MNP and no key, shared MNP management section 2904 does not carry out recording of MNP. Here, shared MNP management section 2904 uses a router advertisement packet in acquiring an MNP and key from another mobile router, in the same manner as the embodiment 1.

Next, shared MNP management section 2904 checks MNP information from another mobile router and in the case where shared MNP management section 2904 does not receive MNP information for a period of predetermined time, it deletes MNP information of that mobile router (step S3004).

Next, location registration processing section 2901 transmits a location registration request packet including all MNPs and keys recorded in MNP/key storage section 2906, to home agent 6, and carries out mobile router registration processing (step S3005).

Figure 35:
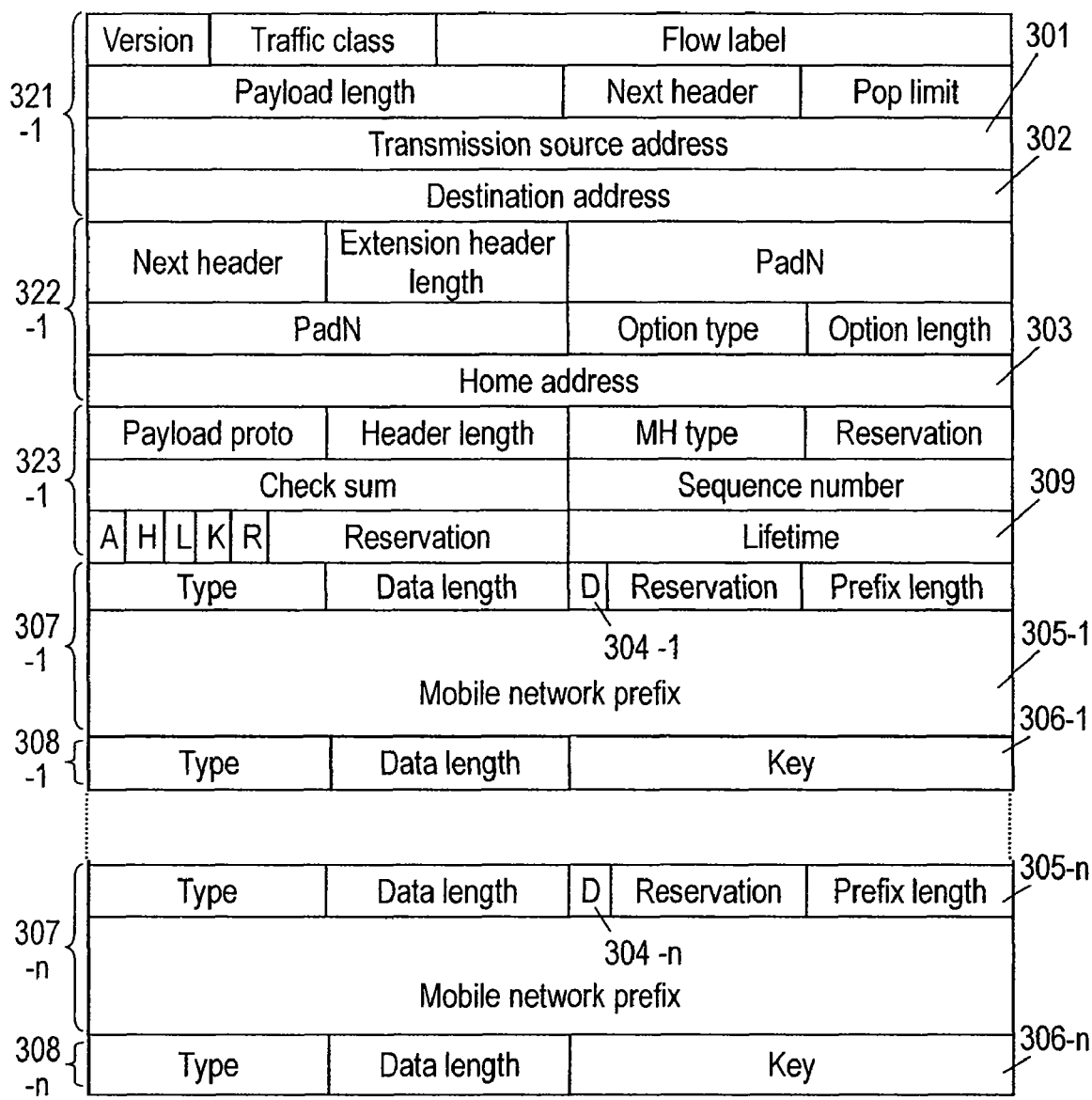
FIG. 35 is a view which shows a format of a location registration response packet in the embodiment 3 of the present invention.
Figure 36:
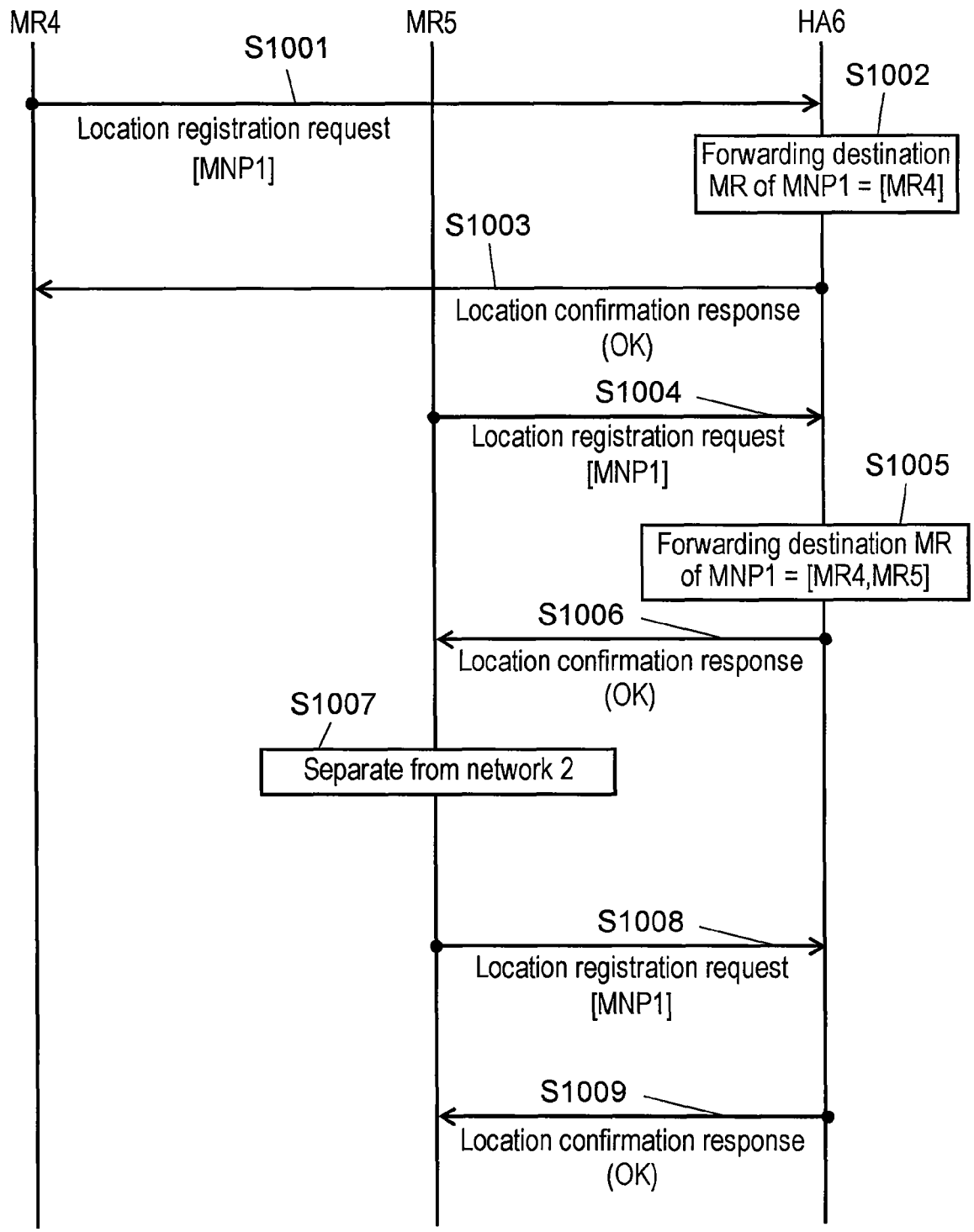
FIG. 36 is a view which shows shared sequence of a network address in prior art.

A format of a location registration request packet which is transmitted by location registration processing section 2901 is shown in FIG. 35. It differs from a format of a location registration request packet in the embodiment 1 (FIG. 26) in that the same number of mobile network prefix options 307 and key options 308 are added as the number of all MNPs and keys which have been stored in MNP/key storage section 2906. The values of D flag field 3304 of MNP/key storage section 2906 are set in D flag fields 304-1 through 304-*n*.

Next, in the case where location registration processing section 2901 changes the network to which it is connected and recognizes that it is connected to different AR3, or periodic updating time measured by a timer which is not shown in the figure has expired (step S3006), processing goes back to step S3002, to carry out mobile router registration processing again.

On the other hand, in the case where a mobile router does not move and also the updating time of registration content to home agent 6 has not expired yet, shared MNP management section 2904 checks whether or not it has acquired an MNP and key from another mobile router (step S3007), and in the case where it has, it records the MNP and key in MNP/key storage section 2906 (step S3008), and thereafter, it goes back to step S3003.

In this way, mobile routers 4 and 5 in this embodiment carry out location registration including MNP unique to itself and MNP acquired from another mobile router, and thereby, can carry out relay to all registered MNPs.

In addition, mobile routers 4, 5 recognize that another mobile router disconnected from moving network 2, through the use of a router advertisement packet, and transmits a location registration request packet from which the MNP of a mobile router which has disconnected is removed, and thereby it is possible to prevent erroneous distribution of a packet, even at the time that a mobile router disconnected.

The foregoing is location registration processing of a mobile router in this embodiment.

Next, an operation of home agent 6 in this embodiment 3 will be explained. A configuration of home agent 6 in this embodiment 3 is identical to that in the embodiment 1. In addition, FIGS. 34A, B are views which show a configuration of information to be recorded in location information/MNP/key storage section 606.

The content of each field (3401 through 3406) is identical to that in the embodiment 1 (FIG. 24), except that one mobile router stores information so as to support a plurality of MNPs (here, MNP1, MNP2) as shown in FIG. 34B. In this configuration, there is no change of packet relay processing in packet transmission/reception/relay processing section 604 due to storing in this manner, but forwarding destination MR selection section 605 selects one out of a plurality of mobile routers of main (D=0) and sub (D=1) with regard to each MNP to relay a packet.

An operation of home agent 6 in this embodiment 3 is different from that in the embodiment 1 only with regard to registration permission judgment processing of a mobile router in FIG. 8 (step S803, FIG. 9).

Figure 31:
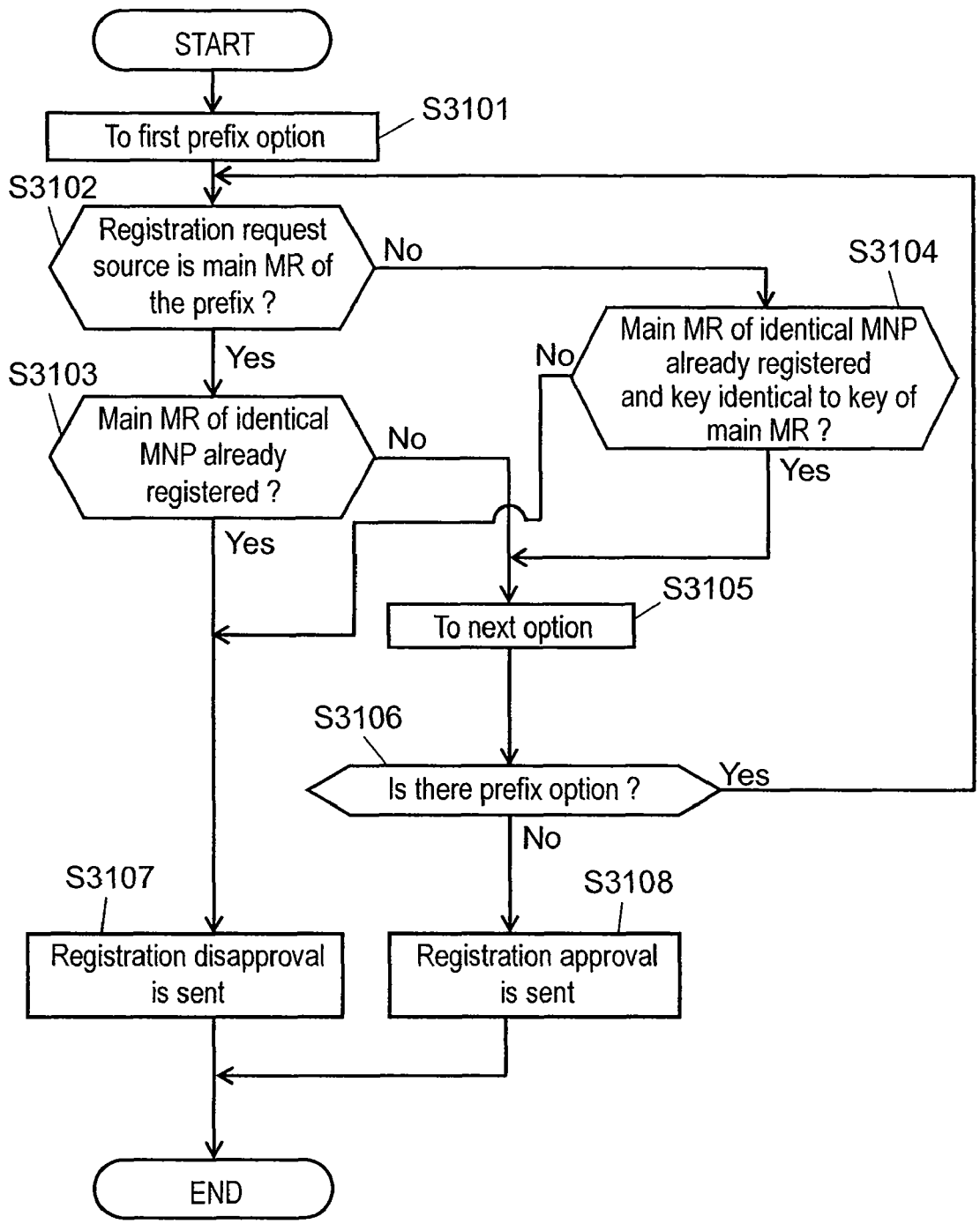
FIG. 31 is a flow chart which shows registration permission judgment processing of a home agent in the embodiment 3 of the present invention.

FIG. 31 is a flow chart which shows registration availability judgment processing of a mobile router, which is carried out by home agent 6 in this embodiment 3.

In this embodiment, since a plurality of mobile network prefix options 307 and key options 308 are added to a location registration request packet, there is need to examine all.

Firstly, packet transmission/reception/relay processing section 604 refers to D flag field 304 of a first mobile network prefix option (step S3101), and thereby, checks whether or not the mobile router which is the registration request source is the main mobile router of the prefix in question (step S3102).

In the case where it is the main mobile router (D=0), if a main mobile router having the identical MNP has been already registered (step S3103), packet transmission/reception/relay processing section 604 sends a response indicating registration disapproval (step S3107), and in the case where such MNP is not registered, it checks the next mobile network prefix option (step S3105). In the case where a mobile network prefix option exists, it goes back to step S3102, and in the case where registration is not impossible for all prefix options, packet transmission/reception/relay processing section 604 sends a response of registration approval (step S3108).

In step S3102, in the case where the mobile router which is the registration request source is a subsidiary mobile router of the prefix in question (D=1) and if a main mobile router with the identical MNP has been already registered and a key which is the same as a key of the main mobile router is included in the key option, processing goes to step S3105 (step S3104).

On the other hand, in the case where the conditions of step S3104 are not satisfied, packet transmission/reception/relay processing section 604 sends a response of registration disapproval (step S3107).

In this embodiment 3, processing is not included in the flow chart (FIG. 31) in the case where a link between a mobile router and MNP has been recorded in MR/MNP-linking storage section 607, but if a link has been recorded in MR/MNP-linking storage section 607 with regard to the MNP by which the main mobile router is managed, the recorded content can be used in the same manner as in the embodiment 1. MR registration permission section 602 carries out the above-mentioned processing in the case where a key option 308 with no corresponding mobile network prefix option 307 is added, or where mobile network prefix option 307 where D=0, and corresponding key option 308 are not added (in this case, since there is no key, sharing MNP with another mobile router is impossible).

Figure 32:
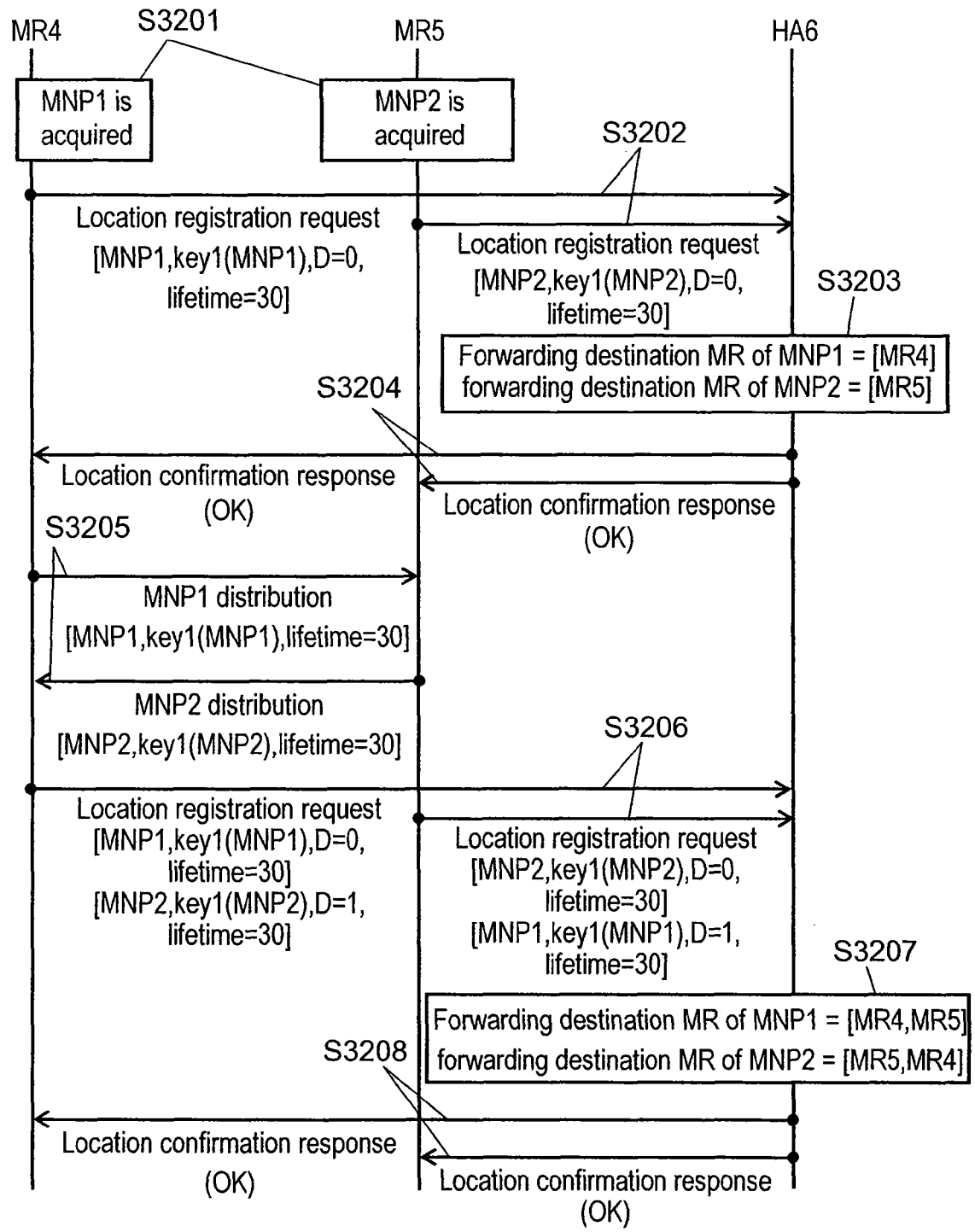
FIG. 32 is a view which shows shared sequence of a network address in the embodiment 3 of the present invention.

FIG. 32 is a sequence chart which shows mobile routers 4, 5 which have respective exclusive MNPs MNP1, MNP2 carrying out location registration to home agent 6, in order to share MNPs Firstly, mobile routers 4, 5 acquire MNP1, MNP2 as respective unique MNPs (step S3201), and each transmit a location registration request to home agent (HA) 6 including corresponding keys Key1 (MNP1) and Key1 (MNP2), requesting to be the main mobile router for MNP1 and MNP2 (D=0), respectively (step S3202).

When home agent 6 receives location registration requests from mobile routers 4, 5, it records mobile router 4 as the MNP1 forwarding destination mobile router, and records mobile router 5 as the MNP2 forwarding destination mobile router (step S3203).

The status of location information/MNP/key storage section 606 of home agent 6 at this time point is shown in FIG. 34A.

Next, home agent 6 transmits a location confirmation response (OK) to mobile routers 4, 5 (step S3204), and mobile routers 4, 5, which receive this, distribute MNP1 and Key1 (MNP1), and MNP2 and Key1 (MNP2), respectively, with a router advertisement packet (step S3205).

Mobile routers 4, 5 acquire respective MNPs from received router advertisement packets, add a location registration request packet to that MNP, and send the packet to home agent 6 (step S3206).

Next, when home agent 6 receives the location registration request packet, it adds mobile router 5 to the group of forwarding destination mobile routers of MNP1, and adds mobile router 4 to the group of forwarding destination mobile routers of MNP2 (step S3207). After that, home agent 6 transmits a location confirmation response (OK) packet to mobile routers 4, 5 (step S3208).

In this manner, according to the present invention, it is possible to configure one moving network with plural mobile routers while allowing each mobile router to retain its exclusive MNP, and therefore there is no need for each terminal under each mobile router to change its address every time the configuration of the moving network changes.

INDUSTRIAL APPLICABILITY

The network address sharing method of the present invention is useful in the case where a network moves, as in equipment in an electric train, bus or automobile, of a network comprising portable equipment carried by an individual, and suitable for improving reliability of the network by providing a plurality of mobile routers.

The invention claimed is:
1. A router location registration method comprising:
a step in which when a first mobile router has a network identifier specifying a moving network to which the first mobile router is connected, the first mobile router generates a key that corresponds to the network identifier and transmits a registration request packet including the network identifier and the key to a home agent which manages a location of the first mobile router;
a step in which in the case where any network identifier which is identical to the network identifier of the first mobile router described in the received registration request packet has not yet been registered, the home agent binds and holds the network identifier and the key of the first mobile router with location information of the first mobile router and registers the first mobile router as a main mobile router of the moving network, and sends a response of registration permission to the first mobile router;

a step in which when the first mobile router receives the response of registration permission from the home agent, the first mobile router distributes the network identifier and the key to a second mobile router in the moving network;

a step in which the second mobile router transmits a registration request packet including the network identifier and the key distributed from the first mobile router, to the home agent which manages the location of the second mobile router; and a step in which when the home agent receives the registration request packet including a network identifier and a key which are identical to an already registered network identifier and key from the second mobile router, the home agent carries out registration or updates the registered information as a subsidiary mobile router which shares the network identifier, wherein the registration request packet further includes lifetime information for information to be registered, and the method further comprises:

a step in which the home agent deletes registration of the registered first mobile router or second mobile router at the time that lifetime has expired;

a step in which the first mobile router periodically updates the key which corresponds to the network identifier and the lifetime information within the lifetime and transmits an update request packet to the home agent;

a step in which when the home agent receives the key update request from the first mobile router registered as the main mobile router, the home agent updates the held key and the remaining lifetime to the received key and lifetime and sends a response giving update permission to the first mobile router;

a step in which, when the first mobile router receives the response of update permission from the home agent, the updated key is distributed to the second mobile router in the moving network; and a step in which the second mobile router transmits an update request packet including the updated key and lifetime information distributed from the first mobile router, to the home agent.

2. The router location registration method of claim 1, further comprising:

a step in which when distribution of the network identifier and the key from the first mobile router has stopped for the lifetime period or longer, the second mobile router acts as the main mobile router and generates a key which corresponds to the network identifier, and transmits a registration request packet including the network identifier and the generated key to the home agent, requesting to be the main mobile router which holds the network identifier; and a step in which when the home agent receives the main mobile router registration request packet from the second mobile router, the home agent judges whether or not a main mobile router with the identical network identifier and the identical key has been registered, and if such router is not registered, the home agent registers the second mobile router as a main mobile router.

3. The router location registration method of claim 1, further comprising:

a step in which, when the network identifier registered by the first mobile router in the home agent is referred as the first network identifier and the key is referred as the first key, a third router, which is connected to the moving network to which the first mobile router is connected, acquires a third network identifier and generates a third key that corresponds to the third network identifier and transmits a registration request packet including the third network identifier and the third key to the home agent;

a step in which when the home agent receives the registration request packet from the third mobile router, the home agent holds the third network identifier and the third key linked with location information of the third mobile router, registers the third mobile router as a main mobile router, and sends a response giving registration permission to the third mobile router;

a step in which when the third mobile router receives the response of registration permission from the home agent, the third mobile router distributes the third network identifier and the third key to a mobile router in the moving network;

a step in which the first mobile router transmits a registration request packet including the third network identifier and the third key distributed from the third mobile router, and the first network identifier and the first key held by itself, to the home agent; and a step in which when the home agent receives a registration request packet from the first mobile router, the home agent updates registration of the first mobile router as a main mobile router of the moving network specified by the first network identifier and as a subsidiary mobile router of the moving network specified by the third network identifier, and sends a response of registration permission to the first mobile router.

4. The router location registration method of claim 1, further comprising:

a step in which, when the network identifier registered by the first mobile router in the home agent is referred as the first network identifier and the key is referred as the first key, a third router, which is connected to the moving network to which the first mobile router is connected, acquires a third network identifier and generates a third key that corresponds to the third network identifier and transmits a registration request packet including the third network identifier and the third key to the home agent;

a step in which when the home agent receives the registration request packet from the third mobile router, the home agent holds the third network identifier and the third key linked with location information of the third mobile router, registers the third mobile router as a main mobile router, and sends a response giving registration permission to the third mobile router;

a step in which when the third mobile router receives the response of registration permission from the home agent, the third mobile router distributes the third network identifier and the third key to a mobile router in the moving network;

a step in which the first mobile router transmits a registration request packet including the third network identifier and the third key distributed from the third mobile router, and the first network identifier and the first key held by itself, to the home agent; and a step in which when the home agent receives a registration request packet from the first mobile router, the home agent updates registration of the first mobile router as a main mobile router of the moving network specified by the first network identifier and as a subsidiary mobile router of the moving network specified by the third network identifier, and sends a response of registration permission to the first mobile router.

5. The router location registration method of claim 4, further comprising:

a step in which when the first mobile router and the third mobile router distribute their own network identifier and key, they also distribute lifetime of the network identifier and the key, and when the lifetime of the network identifier and the key has expired, they transmit a registration request packet which does not include the network identifier and the key for which lifetime has expired to the home agent.

6. A router location registration method comprising:

a step in which when a first mobile router holds a network identifier specifying a moving network to which it is connected, the first mobile router transmits a registration request packet including the network identifier to a home agent which manages the location of the first mobile router;

a step in which the home agent sends a response of registration disapproval to the first mobile router in the case where a network identifier which is identical to the network identifier of the first mobile router described in the received registration request packet has been already registered, and in the case where it has not yet been registered, the home agent generates a key which corresponds to the network identifier, holds and binds the network identifier and the key with location information of the first mobile router, registers the first mobile router as a main mobile router of the moving network, includes the key in a response giving registration permission, and distributes it to the first mobile router;

a step in which when the first mobile router receives the response giving registration permission from the home agent, the first mobile router distributes the network identifier and the key to a second mobile router in the moving network;

a step in which the second mobile router transmits a registration request packet including the network identifier and the key distributed from the first mobile router to the home agent which manages a location of the second mobile router; and a step in which when the home agent receives the registration request packet including the network identifier and the key which are identical to a registered network identifier and key, the home agent carries out registration or update of registered information as a subsidiary mobile router which shares the network identifier, wherein the registration request further includes lifetime information for information to be registered and the method further comprises:

a step in which the home agent deletes registration of the registered first mobile router or second mobile router at the time that lifetime has expired;

a step in which the first mobile router periodically transmits an update request packet including lifetime information to the home agent within the lifetime;

a step in which the home agent periodically updates the key which corresponds to the network identifier and, when it receives the update request from the first mobile router, distributes the updated key;

a step in which when the first mobile router receives the distribution of the updated key from the home agent, the first mobile router distributes the key to a second mobile router in the moving network; and a step in which the second mobile router transmits an update request packet including the updated key and lifetime information distributed from the first mobile router, to the home agent.

7. The router location registration method of claim 6, which in the case where distribution of the key from the first mobile router has stopped for the lifetime period or longer, further comprises a step in which the second mobile router acts as the main mobile router and transmits a registration request packet including the network identifier.

8. A mobile router comprising:

a network identifier sharing section which acquires a network identifier specifying a moving network and a key that corresponds to the network identifier, from an identifier distribution packet distributed from another mobile router in the moving network to which the mobile router is connected;

a subsidiary mobile router registration section which transmits a registration request packet including the distributed network identifier, the key, status information showing that it is a mobile router which acquired the network identifier from the another mobile router, and location information of the mobile router;

a subsidiary mobile router registration update section which transmits a registration request packet requesting a home agent to update registration information, in the case where an updated key is received from the another mobile router in the identifier distribution packet;

a status management section which makes or cancels the setting for functioning as a main mobile router of a moving network;

a key generation section which generates a key that corresponds to the network identifier; and a main mobile router registration section which transmits a registration request packet including registration information composed of location information of the mobile router, the network identifier, the generated key, status information indicating that it is the main mobile router, and lifetime of the registration information, to the home agent which manages the location of the mobile router, wherein if any identifier distribution packet from another mobile router is not received for a predetermined time period, the status management section makes the setting for functioning as a main mobile router, instructs the key generation section to generate a key, and instructs the main mobile router registration section to transmit a registration request packet including the generated key, to the home agent.

9. The mobile router of claim 8, further comprising:

a status management section which makes or cancels the setting for functioning as a main mobile router of a moving network; and a main mobile router registration section which transmits a registration request packet including registration information composed of location information of the mobile router, the network identifier, status information indicating that the mobile router is the main mobile router, and lifetime of the registration information, to the home agent which manages the location of the mobile router, wherein if any identifier distribution packet from another mobile router is not received for a predetermined time period, the status management section makes the setting for functioning as a main mobile router, and instructs the main mobile router registration section to transmit a registration request packet.

10. The mobile router of claim 9, wherein the identifier distribution packet includes lifetime of registration information, and the lifetime is configured as the predetermined time by the status management section.

11. The mobile router of claim 8, wherein the identifier distribution packet includes lifetime of registration information, and the lifetime is configured as the predetermined time by the status management section.

* * * * *